United States Patent
Takahashi et al.

(10) Patent No.: US 12,461,384 B2
(45) Date of Patent: Nov. 4, 2025

(54) AIR FLOATING VIDEO DISPLAY APPARATUS

(71) Applicant: Maxell, Ltd., Kyoto (JP)

(72) Inventors: Hiroaki Takahashi, Kyoto (JP); Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/268,621

(22) PCT Filed: Mar. 10, 2022

(86) PCT No.: PCT/JP2022/010739
§ 371 (c)(1),
(2) Date: Jun. 21, 2023

(87) PCT Pub. No.: WO2022/209721
PCT Pub. Date: Oct. 6, 2022

(65) Prior Publication Data
US 2024/0045227 A1  Feb. 8, 2024

(30) Foreign Application Priority Data
Mar. 31, 2021  (JP) ................. 2021-061560

(51) Int. Cl.
*G02B 30/56*  (2020.01)
*G02F 1/1335*  (2006.01)
(Continued)

(52) U.S. Cl.
CPC ....... *G02B 30/56* (2020.01); *G02F 1/133512* (2013.01); *G02F 1/133528* (2013.01);
(Continued)

(58) Field of Classification Search
None
See application file for complete search history.

(56) References Cited

U.S. PATENT DOCUMENTS

2006/0232747 A1* 10/2006 Thornton ............... G02B 30/56
353/7
2017/0099480 A1  4/2017 Kaneda et al.
(Continued)

FOREIGN PATENT DOCUMENTS

JP  2015-194601 A  11/2015
JP  2018-031925 A  3/2018
(Continued)

OTHER PUBLICATIONS

International Search Report and Written Opinion mailed on May 24, 2022, received for PCT Application PCT/JP2022/010739, filed on Mar. 10, 2022, 14 pages including English Translation.
(Continued)

*Primary Examiner* — Dung T Nguyen
(74) *Attorney, Agent, or Firm* — XSENSUS LLP

(57) ABSTRACT

A compact and portable air floating video display apparatus includes a housing that can be installed in a bottle holder in a vehicle. A video display apparatus, a beam splitter, a retroreflector, a retardation plate, and a plane mirror are provided in the housing. In the air floating video display apparatus, a video light of a specific polarized wave from the video display apparatus is reflected by the plane mirror, transmitted through the beam splitter, and subjected to polarization conversion by being reflected by the retroreflector and passing through the retardation plate. Then, the video light is reflected by the beam splitter and transmitted through the window, thereby displaying an air floating video outside the apparatus.

23 Claims, 20 Drawing Sheets

(51) Int. Cl.
 *G03B 21/00* (2006.01)
 *H05K 5/00* (2006.01)
 *G02B 5/136* (2006.01)
 *G02B 27/28* (2006.01)

(52) U.S. Cl.
 CPC ......... *G03B 21/006* (2013.01); *H05K 5/0086* (2013.01); *G02B 5/136* (2013.01); *G02B 27/288* (2013.01)

(56) References Cited

U.S. PATENT DOCUMENTS

| | | |
|---|---|---|
| 2018/0024373 A1 | 1/2018 | Joseph et al. |
| 2018/0031878 A1* | 2/2018 | Koito .................... G02F 1/1335 |
| 2018/0157049 A1* | 6/2018 | Houzyou ........... G03B 21/2006 |
| 2019/0227489 A1 | 7/2019 | Tokuchi |
| 2019/0285904 A1 | 9/2019 | Kim et al. |
| 2022/0219538 A1 | 7/2022 | Hirata et al. |

FOREIGN PATENT DOCUMENTS

| | | |
|---|---|---|
| JP | 2019-101055 A | 6/2019 |
| JP | 2019-109407 A | 7/2019 |
| JP | 2019-128722 A | 8/2019 |
| JP | 2019145883 A | 8/2019 |
| JP | 2019207370 A | 12/2019 |
| JP | 2020-064086 A | 4/2020 |
| JP | 2020-197564 A | 12/2020 |
| WO | 2013/118698 A1 | 8/2013 |
| WO | 2016088683 A1 | 10/2017 |
| WO | 2018/139035 A1 | 8/2018 |

OTHER PUBLICATIONS

Japanese Office Action issued Nov. 26, 2024, in Japanese Patent Application No. 2024-070998, 6pp.

* cited by examiner (A)

(B)

(A)

AIR FLOATING VIDEO DISPLAY APPARATUS (B)

R1: NORMAL IMAGE
G1-G6: GHOST IMAGE

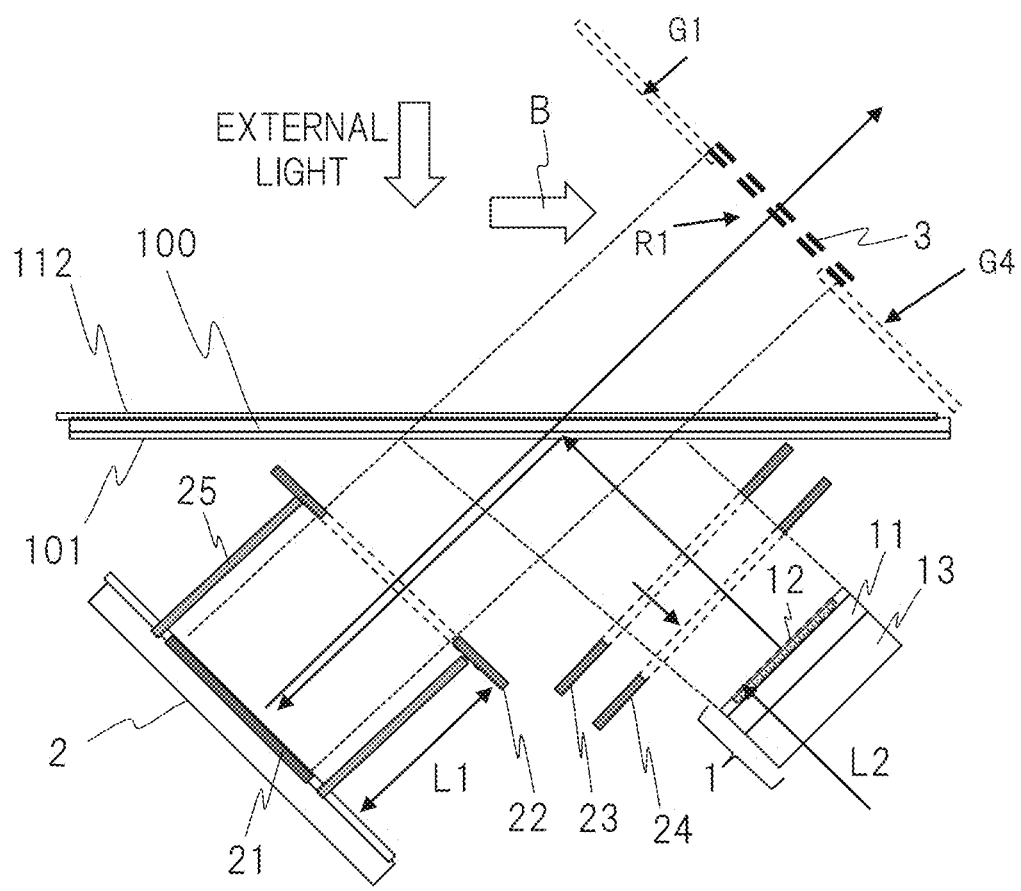

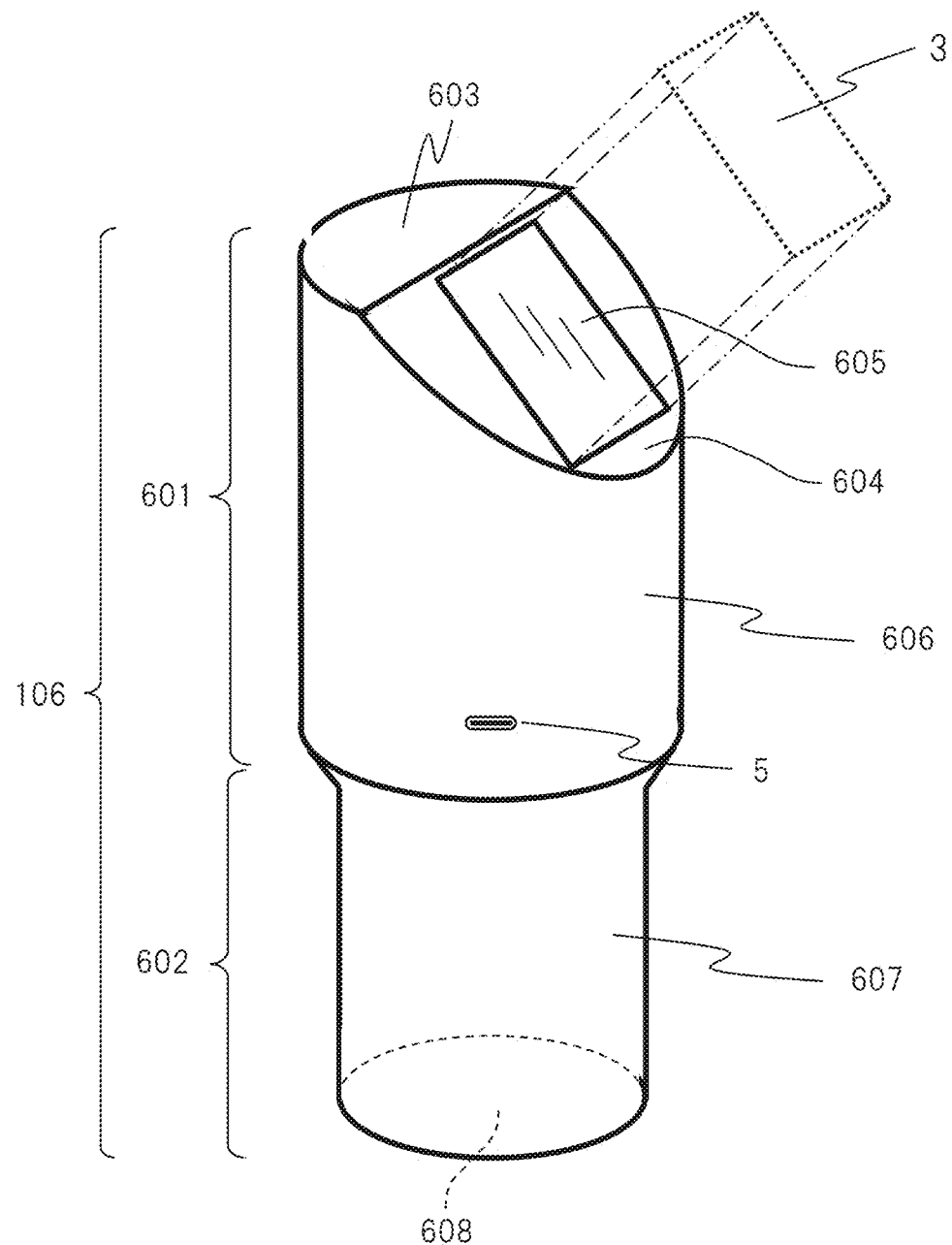

1: VIDEO DISPLAY APPARATUS
2: RETROREFLECTOR
3: AIR FLOATING VIDEO
4: PLANE MIRROR
11: LIQUID CRYSTAL DISPLAY PANEL
12: ABSORPTIVE POLARIZING PLATE
13: LIGHT SOURCE APPARATUS
21: λ/4 PLATE
100: TRANSPARENT MEMBER
101: BEAM SPLITTER
    (POLARIZATION SEPARATOR)
106: HOUSING
605: WINDOW PORTION (A)

(B)

(C)

(A)

(B)

(A)

(B)

(A)

(B)

(A)

(B)

(C)

AIR FLOATING VIDEO DISPLAY APPARATUS

CROSS-REFERENCE TO RELATED APPLICATIONS

The present application is based on PCT filing PCT/JP2022/010739, filed Mar. 10, 2022, which claims priority to JP 2021-061560, filed Mar. 31, 2021, the entire contents of each are incorporated herein by reference.

TECHNICAL FIELD

The present invention relates to an air floating video display apparatus.

BACKGROUND ART

As an example of the air floating video display apparatus, Patent Document 1 discloses the description of "a CPU of an information processing apparatus includes an approaching direction detector configured to detect an approaching direction of a user to an image formed in the air, an input coordinate detector configured to detect coordinates where an input is detected, an operation receiver configured to process a reception of operation, and an operation screen updater configured to update an operation screen according to a received operation. The CPU receives a motion of the user as an operation when the user approaches the image from a predetermined direction, and performs the processing according to the operation (excerpt from abstract)".

RELATED ART DOCUMENTS

Patent Documents

Patent Document 1: Japanese Unexamined Patent Application Publication No. 2019-128722

SUMMARY OF THE INVENTION

Problems to be Solved by the Invention

Although the air floating video display apparatus of Patent Document 1 described above can improve the operability of the air floating video, it does not take into consideration the improvement of the visual resolution and contrast of the air floating video, and further improvement in video quality has been demanded under current circumstances.

Here, air floating video display apparatuses have a wide range of applications, and can achieve the effect of attracting the attention of a lot of people from the rarity of "floating video is displayed in the air" that is not possible in the conventional flat display if used as signage (advertising billboards). In addition, as described in Patent Document 1, if an air floating video is used as a human interface for performing some kind of operation, it is possible to achieve the effect of preventing virus infection via contact parts such as push buttons owing to its non-contact feature.

On the other hand, conventionally, there has been no practical example of using the air floating video display apparatus as a mobile, that is, portable type. For example, if an air floating video display apparatus can be easily carried with one hand and can display the air floating video wherever and whenever the user wants, it can be used as a part of an entertainment system, as well as it has a potential to greatly expand their applications in information announcements and the like.

In particular, if it is possible to easily install the air floating video display apparatus in vehicles such as automobiles, a video of a human or the like (hereinafter referred to as a concierge) displayed as an air floating video can give route guidance and POI (Point Of Interest) information to a driver and passengers. Conversely, it is also possible for the driver and passengers to instruct the concierge to set the temperature of the air conditioner, select music, and the like by means of voice or the like, and the concierge can respond to the instructions with video and voice. As a result, it will be possible to provide safer, more comfortable, and visually stimulating driving assistance than that by the normal instruction using button operations.

An object of the present invention is to provide an air floating video display apparatus capable of displaying a favorable air floating video with high visibility and further provide a compact and portable air floating video display apparatus suitable for use in vehicles.

Means for Solving the Problem

In order to solve the problem described above, for example, the configuration described in claims is adopted. Although this application includes a plurality of means for solving the problem, one example thereof can be presented as follows. That is, an air floating video display apparatus includes: a housing with a cylindrical shape; a window portion which is provided in a part of the housing and through which a video light for forming an air floating video passes; a video display apparatus which is provided inside the housing and includes a light source apparatus and a liquid crystal display panel configured to generate the video light of a specific polarized wave for forming the air floating video based on a light from the light source apparatus and emit the generated light; a polarization separator which is provided inside the housing and is configured to transmit the video light of the specific polarized wave from the video display apparatus and reflect the video light from a retroreflector; the retroreflector which is provided inside the housing and is configured to retroreflect the video light from the polarization separator; a retardation plate provided on a retroreflection surface of the retroreflector; and a plane mirror which is arranged in a space connecting the video display apparatus and the polarization separator inside the housing and is configured to reflect the video light of the specific polarized wave from the video display apparatus toward the polarization separator, wherein the video light of the specific polarized wave from the video display apparatus is reflected by the plane mirror and transmitted through the polarization separator toward the retroreflector, the video light which has been subjected to polarization conversion by passing through the retardation plate is reflected by the polarization separator toward the window portion, and the air floating video is displayed outside the housing by the video light which has transmitted through the window portion.

Effects of the Invention

According to the present invention, it is possible to provide an air floating video display apparatus capable of displaying a favorable air floating video with high visibility. Further, by making the air floating video display apparatus compact, light-weight, and portable, it is possible to use the air floating video display apparatus anytime and anywhere. In particular, in consideration of the use in vehicles, the air floating video display apparatus is designed to have a shape capable of being installed and stored in a bottle holder or the like in the vehicles, whereby it is possible to contribute to greatly improving the convenience for the user. The problems, configurations, and effects other than those described above will be apparent from the following description of the embodiments.

BRIEF DESCRIPTIONS OF THE DRAWINGS

FIG. 6A is a diagram showing another example of the configuration of the main part of the air floating video display apparatus according to one embodiment of the present invention;

FIG. 6B is a diagram showing an external appearance of the air floating video display apparatus capable of being installed in a bottle holder according to one embodiment of the present invention;

DETAILED DESCRIPTION OF PREFERRED EMBODIMENTS

Figure 1:
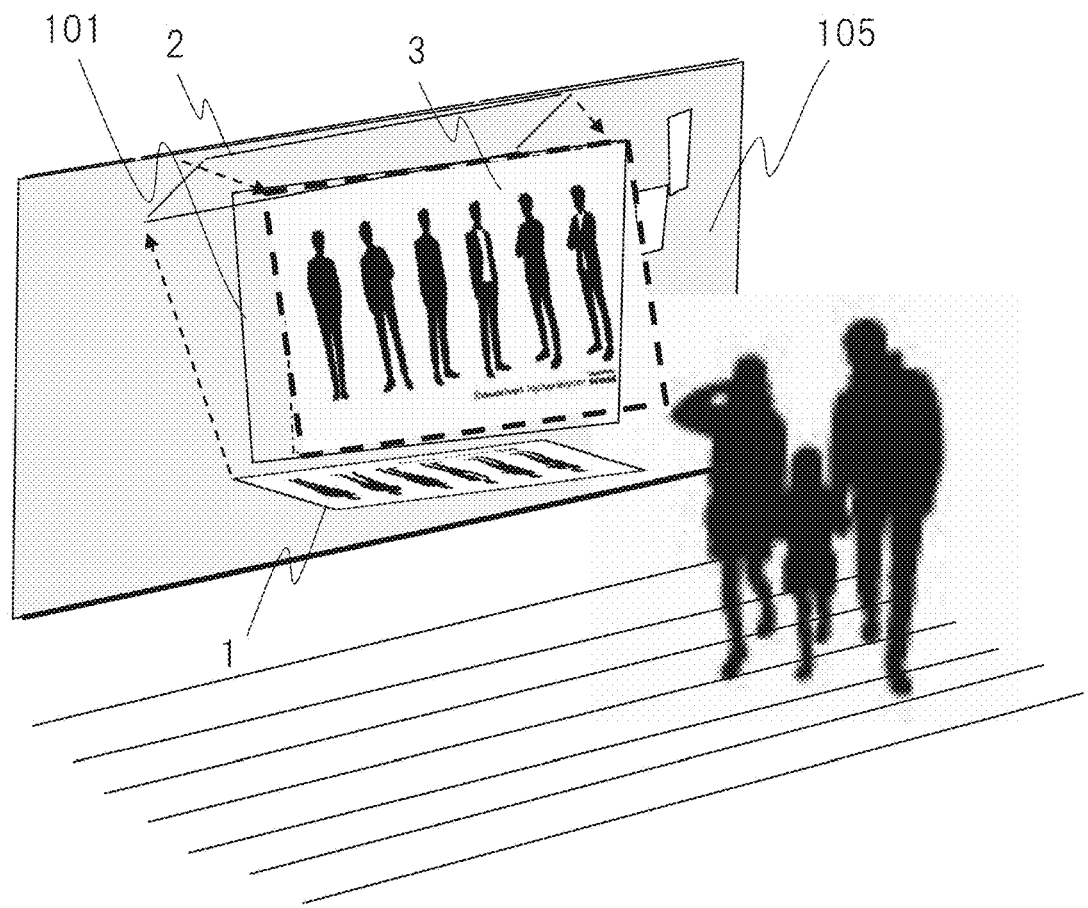
FIG. 1 is a diagram showing an example of usage form of an air floating video display apparatus according to one embodiment of the present invention.
Figure 1:
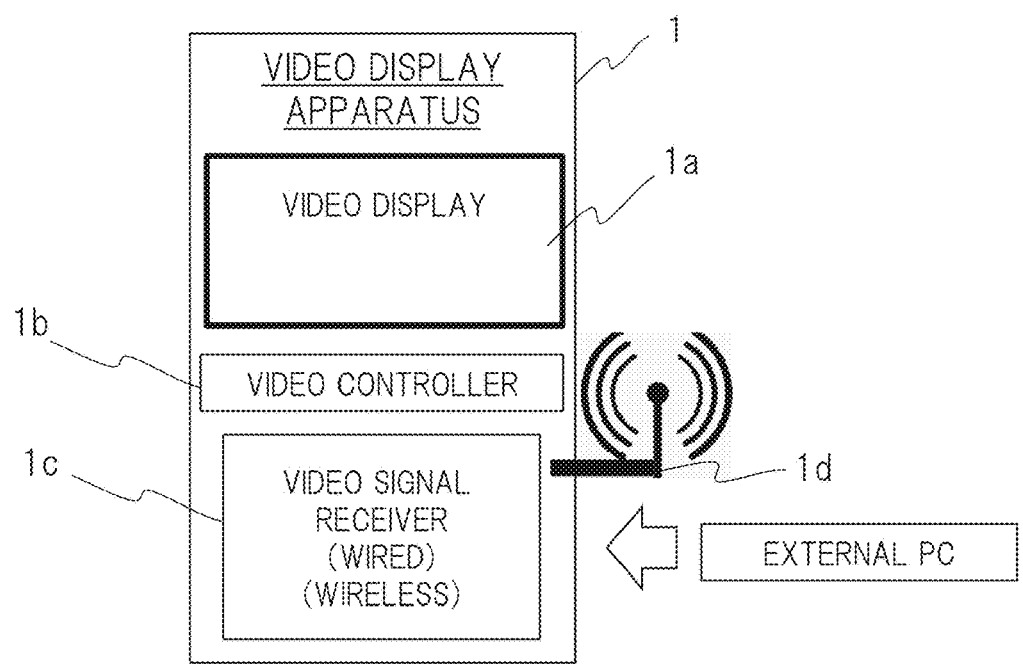

Hereinafter, embodiments of the present invention will be described in detail with reference to the drawings. Note that the present invention is not limited to the disclosed embodiments, and various changes and modifications can be made by those skilled in the art within the scope of the technical idea disclosed in this specification. In all the drawings for describing the present invention, components having the same function are denoted by the same reference characters, and description thereof is not repeated in some cases.

The following embodiments relate to, for example, an air floating video display apparatus in which a video by a video light from a large-area video light emission source is transmitted through a transparent member such as a glass of a show window that partitions a space and can be displayed inside or outside the space of a store as an air floating video, and further relate to a large-scale digital signage system composed of a plurality of such air floating video display apparatuses.

According to the following embodiments, for example, it is possible to display high-resolution video information above a glass surface of a show window or a light-transmitting plate material in a state of floating in space. At this time, according to the following embodiments, by making the divergence angle of the emitted video light small, that is, an acute angle, and further aligning the video light with a specific polarized wave, only the normal reflected light is efficiently reflected to the retroreflector, so that the light utilization efficiency can be increased, the ghost image generated in addition to the main air floating video, which has been a problem in the conventional retroreflective system, can be suppressed, and a clear air floating video can be obtained. Also, with the apparatus including the light source of the present embodiment, it is possible to provide a novel and highly usable air floating video display apparatus capable of significantly reducing power consumption. Further, it is also possible to provide an air floating video display apparatus capable of displaying a so-called unidirectional air floating video which can be visually recognized outside the vehicle through shield glasses including a windshield, a rear glass, and a side glass of the vehicle.

Figure 3:
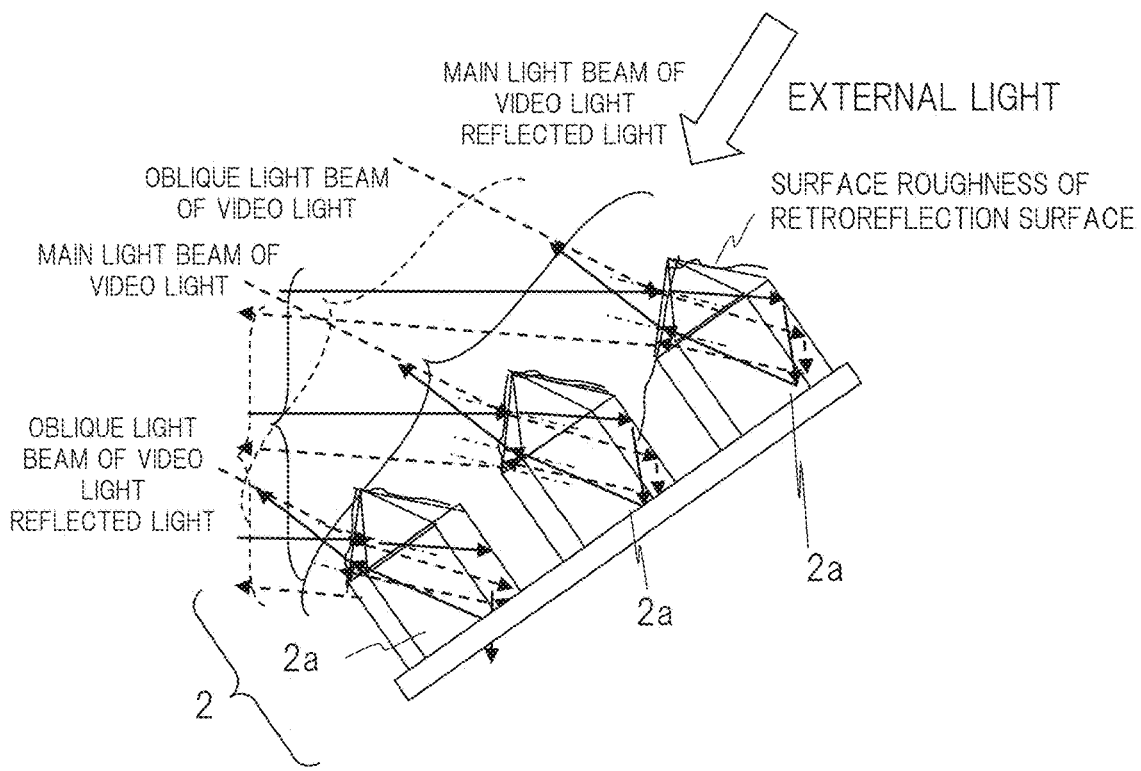
FIG. 3 is a diagram showing a problem of an air floating video display apparatus.
Figure 5:
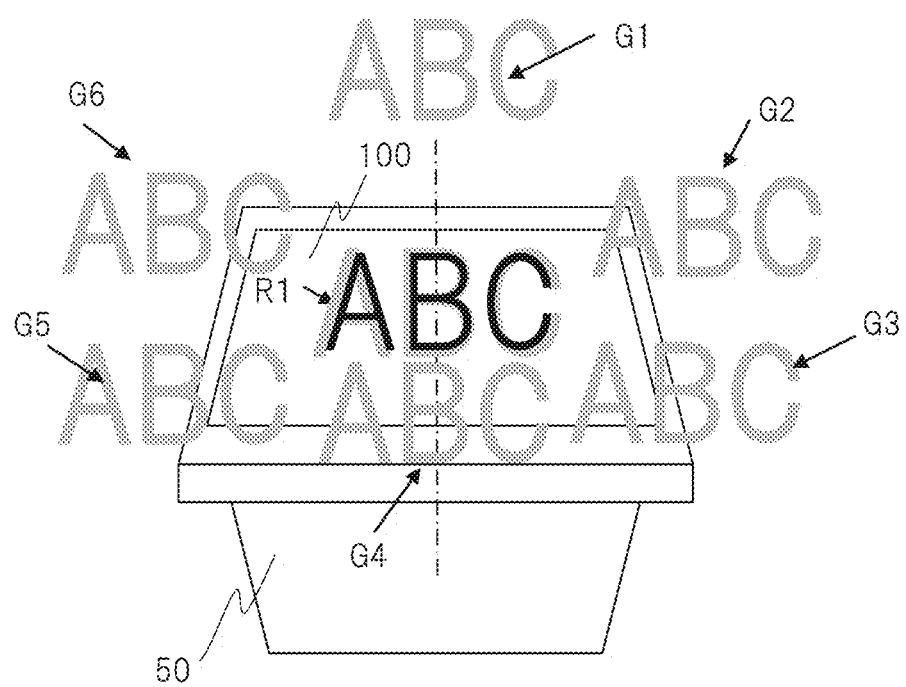
FIG. 5 is a diagram showing a problem of the air floating video display apparatus.

On the other hand, in the conventional air floating video display apparatus, an organic EL panel or a liquid crystal display panel is combined as a high-resolution color display video source with a retroreflector. In the air floating video display apparatus according to the conventional technique, since video light is diffused at a wide angle and the retroreflection portion is a hexahedron, ghost images are generated by the video light obliquely entering a retroreflector 2 (retroreflection sheet) as shown in FIG. 3 in addition to the reflection light reflected normally, thereby deteriorating the image quality of the air floating video. Since the retroreflector (retroreflection portion 2a) shown as a conventional technique is a hexahedron, a plurality of ghost images from the first ghost image G1 to the sixth ghost image G6 are generated in addition to the normal image R1 of the air floating video as shown in FIG. 5. Therefore, the ghost image corresponding to the same air floating video is monitored by a person other than an observer, and there is a significant problem in terms of security.

Figure 4:
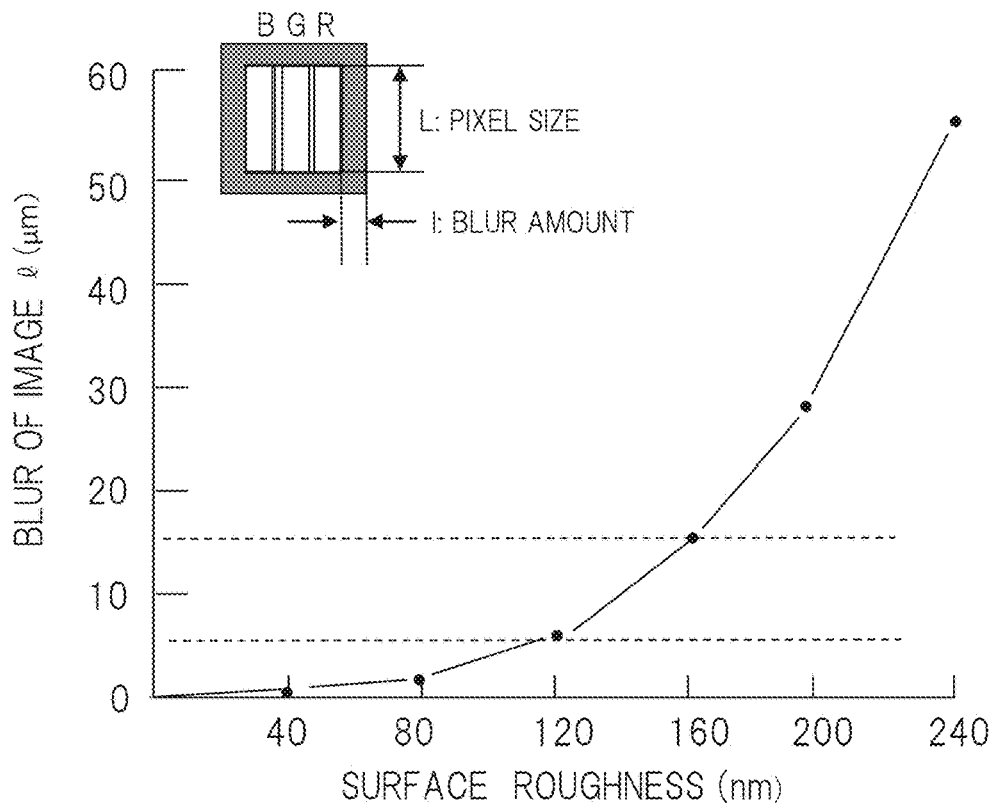
FIG. 4 is a characteristic diagram showing the relationship between a surface roughness of a retroreflector and a blur amount of a retroreflection image.

Also, in the air floating video obtained by reflecting a video light from a video display apparatus having narrow-angle directional characteristics described later by a retroreflector, a blur is visually recognized in each pixel of a liquid crystal display panel as shown in FIG. 4 in addition to the ghost image described above.

<Air Floating Video Display Apparatus (1)>

FIG. 1 shows an example of usage form of an air floating video display apparatus according to one embodiment of the present invention. FIG. 1(A) shows an overall configuration of the air floating video display apparatus according to the present embodiment. For example, in a store or the like, a space is partitioned by a show window (window glass 105) which is a translucent member such as a glass (transparent member). The air floating video display apparatus according to the present embodiment can display the air floating video to the outside of the space of the store in a single direction through such a transparent member. Specifically, light of a specific polarized wave with narrow-angle directional characteristics is emitted from a video display apparatus 1 as a video light flux, once enters the retroreflector 2, is retroreflected and passes through the window glass 105, thereby forming an aerial image (air floating video 3) which is a real image on the outside of the store. In FIG. 1, the inner side of the window glass 105 (the inside of the store) is shown in the depth direction, and the outer side thereof (e.g., a sidewalk) is shown on the front side. On the other hand, it is also possible to form an aerial image at a desired position in the store by providing a reflector configured to reflect a specific polarized wave on the window glass 105.

FIG. 1(B) is a block diagram showing a configuration of the video display apparatus 1 described above. The video display apparatus 1 includes a video display 1a configured to display an original image of an aerial image, a video controller 1b configured to convert an input video in accordance with the resolution of a panel, a video signal receiver 1c configured to receive a video signal, and a receiving antenna 1d. The video signal receiver 1c is configured to handle signals input via a wired communication such as USB (Universal Serial Bus: registered trademark) input or HDMI (High-Definition Multimedia Interface: registered trademark) input and signals input via a wireless communication such as Wi-Fi (Wireless Fidelity: registered trademark), can function independently as a video receiver/display, and can also display video information from a tablet, a smartphone, and the like. Further, if a stick PC or the like is connected, it can be provided with the capability of calculation processing, image analysis processing, and the like.

Figure 2:
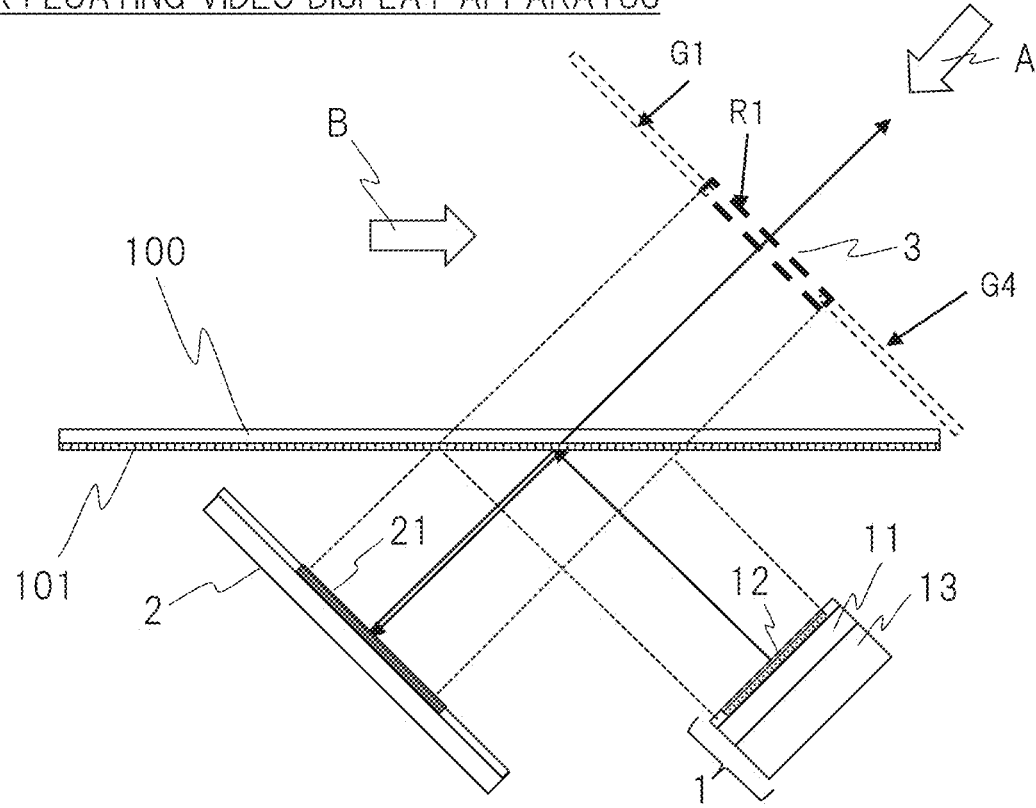
FIG. 2 is a diagram showing an example of a configuration of the main part and a configuration of a retroreflection portion of the air floating video display apparatus according to one embodiment of the present invention.
Figure 2:
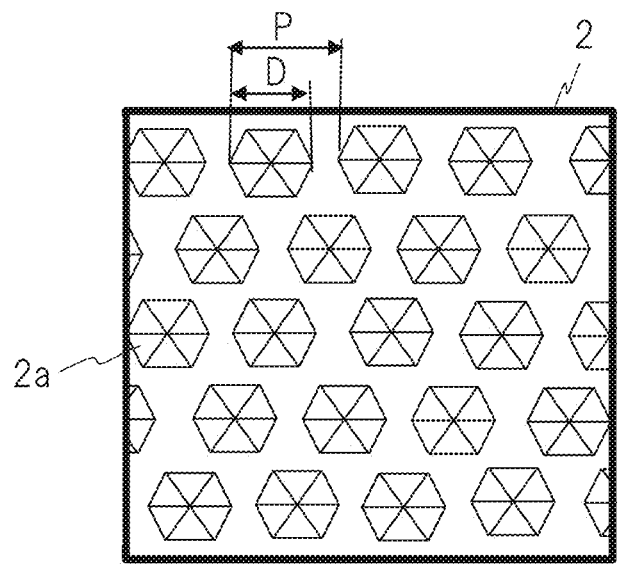

FIG. 2 shows an example of a configuration of the main part and a configuration of a retroreflection portion of the air floating video display apparatus according to one embodiment of the present invention. The configuration of the air floating video display apparatus will be described more specifically with reference to FIG. 2. As shown in FIG. 2(A), the video display apparatus 1 which diverges video light of a specific polarized wave at a narrow angle is provided in the oblique direction of the transparent member 100 such as glass. The video display apparatus 1 includes a liquid crystal display panel 11 and a light source apparatus 13 configured to generate light of a specific polarized wave having narrow-angle diffusion characteristics.

The video light of the specific polarized wave from the video display apparatus 1 is reflected by a polarization separator 101 having a film selectively reflecting the video light of the specific polarized wave provided on the transparent member 100, and enters the retroreflector 2. In the example of FIG. 2, the polarization separator 101 is formed in a sheet shape and is adhered to the transparent member 100. A λ/4 plate 21 is provided on the video light incident surface of the retroreflector 2. The video light passes through the λ/4 plate 21 twice, that is, when the video light enters the retroreflector 2 and when the video light is emitted from the retroreflector 2, whereby the video light is subjected to polarization conversion from the specific polarized wave to the other polarized wave. Here, since the polarization separator 101 which selectively reflects the video light of the specific polarized wave has a property of transmitting the polarized light of the other polarized wave subjected to the polarization conversion, the video light of the specific polarized wave after the polarization conversion transmits through the polarization separator 101. The video light that has transmitted through the polarization separator 101 forms the air floating video 3, which is a real image, on the outside of the transparent member 100.

Note that the light that forms the air floating video 3 is a set of light beams converging from the retroreflector 2 to the optical image of the air floating video 3, and these light beams go straight even after passing through the optical image of the air floating video 3. Therefore, the air floating video 3 is a video having high directivity, unlike diffused video light formed on a screen by a general projector or the like. Therefore, in the configuration of FIG. 2, when the user visually recognizes the air floating video 3 from the direction of an arrow A, the air floating video 3 is visually recognized as a bright video, but when another person visually recognizes the video from the direction of an arrow B, the air floating video 3 cannot be visually recognized as a video at all. These characteristics are very suitable for use in a system that displays a video requiring high security or a highly confidential video that is desired to be kept secret from a person facing the user.

Note that, depending on the performance of the retroreflector 2, the polarization axes of the video light after reflection are not aligned in some cases. In this case, a part of the video light whose polarization axes are not aligned is reflected by the polarization separator 101 described above and returns to the video display apparatus 1. This light is reflected again on the video display surface of the liquid crystal display panel 11 constituting the video display apparatus 1, so that a ghost image is generated and the image quality of the air floating video 3 is deteriorated in some cases. Therefore, in the present embodiment, an absorptive polarizing plate 12 is provided on the video display surface of the video display apparatus 1. The video light emitted from the video display apparatus 1 is transmitted through the absorptive polarizing plate 12, and the reflected light returning from the polarization separator 101 is absorbed by the absorptive polarizing plate 12. Thereby, the re-reflection described above can be suppressed, and it is possible to prevent deterioration in image quality due to the ghost image of the air floating video.

The polarization separator 101 described above may be formed of, for example, a reflective polarizing plate or a metal multilayer film that reflects a specific polarized wave.

Then, FIG. 2(B) shows a surface shape of the retroreflector 2 manufactured by Nippon Carbide Industries Co., Inc.

used in this study as the typical retroreflector 2. In the retroreflector 2, the light beam that enters the retroreflection portion 2a composed of regularly arranged hexagonal columns is reflected by the wall surfaces and bottom surfaces of the hexagonal columns and emitted as retroreflected light in a direction corresponding to the incident light, and forms the normal image R1 shown in FIG. 5. On the other hand, as shown in FIG. 3, the ghost images (ghost images G1 to G6 in FIG. 5) are formed in addition to the normal image R1 by the video light, which has obliquely entered the retroreflector 2, of the video light from the video display apparatus 1.

Thus, in the air floating video display apparatus according to the present embodiment, the air floating video 3 which is a real image is displayed based on the video displayed on the video display apparatus 1 of the present invention without forming ghost images. The resolution of the air floating video 3 largely depends on the outer diameter D and pitch P of the retroreflection portions 2a of the retroreflector 2 shown in FIG. 2(B), in addition to the resolution of the liquid crystal display panel 11. For example, when the liquid crystal display panel 11 of a 7-inch WUXGA (1920×1200 pixels) is used, even if one pixel (one triplet) is about 80 μm, one pixel of the air floating video 3 is about 300 μm if the diameter D of the retroreflection portion 2a is 240 μm and the pitch is 300 μm, for example. Therefore, the effective resolution of the air floating video 3 is reduced to about ⅓. Therefore, in order to make the resolution of the air floating video 3 equal to the resolution of the video display apparatus 1, it is desired that the diameter D and the pitch P of the retroreflection portions 2a are close to one pixel of the liquid crystal display panel. On the other hand, in order to suppress the occurrence of moire caused by the retroreflector 2 and the pixels of the liquid crystal display panel 11, it is preferable to design each pitch ratio so as not to be an integral multiple of one pixel. Further, the shape is preferably arranged such that any one side of the retroreflection portion 2a does not overlap with any one side of one pixel of the liquid crystal display panel 11.

The inventors fabricated the video display apparatus 1 by combining a liquid crystal display panel with a pixel pitch of 40 μm and a light source with a narrow divergence angle (divergence angle of 15°) of the present invention, and obtained the relationship between the acceptable blur amount l of the image of the air floating video and the pixel size L by experiment in order to improve the visibility. FIG. 4 shows the experimental results. It has been found that the blur amount l that deteriorates the visibility is preferably 40% or less of the pixel size L, and the blur is almost unnoticeable if it is 15% or less. Also, it has been found that the surface roughness of the reflection surface by which the blur amount l is an acceptable amount in this case has an average roughness of 160 nm or less in the range of the measurement distance of 40 μm, and the surface roughness of the reflection surface is desirably 120 nm or less for achieving the more unnoticeable blur amount l. Therefore, it is desirable to reduce the surface roughness of the retroreflector 2 described above and reduce the surface roughness including the reflection film forming the reflection surface and its protection film to the above-described value or less. On the other hand, in order to manufacture the retroreflector 2 at a low cost, the retroreflector may be molded by using the roll press method. Specifically, this is a method of aligning retroreflection portions 2a and shaping the retroreflection portions 2a on a film. In this method, the retroreflector 2 having a desired shape is obtained by forming a reverse shape of the shape to be shaped on a roll surface, applying an ultraviolet curable resin on a fixing base material, shaping a necessary shape by passing the resin between rolls, and curing the resin by irradiation with ultraviolet rays.

The video display apparatus 1 of the present invention includes the liquid crystal panel 11 and the light source apparatus 13 configured to generate a light of a specific polarized wave with narrow-angle diffusion characteristics described later, and thus can realize a structurally excellent system in which there is low probability that the video enters obliquely with respect to the retroreflector 2 described above, the generation of the ghost image can be suppressed, and the brightness of the ghost image is low even if the ghost image is generated.

<Air Floating Video Display Apparatus (2)>

FIG. 6A shows another example (second example) of the configuration of the main part of the air floating video display apparatus according to one embodiment of the present invention. The video display apparatus 1 includes the liquid crystal display panel 11 as a video display element and the light source apparatus 13 configured to generate the light of a specific polarized wave with narrow-angle diffusion characteristics. The liquid crystal display panel 11 is composed of a liquid crystal display panel of a selected size, from a small liquid crystal panel with a screen size of about inches to a large liquid crystal display panel with a screen size of more than 80 inches. The video light from the liquid crystal display panel 11 is reflected toward the retroreflector 2 by the polarization separator 101 such as a reflective polarizing plate.

The λ/4 plate 21 is provided on the light incident surface of the retroreflector 2, and the video light is subjected to polarization conversion by passing through the λ/4 plate 21 twice, that is, a specific polarized wave (one polarized wave) is converted into the other polarized wave. Thereby, the light of the other polarized wave after the polarization conversion is transmitted through the polarization separator 101, and the air floating video 3, which is a real image, is displayed on the outside of the transparent member 100. An absorptive polarizing plate 112 is provided on the external light incident surface of the transparent member 100. In the above-described polarization separator 101, since the polarization axes are not aligned in some cases due to retroreflection of the light, a part of the video light is reflected and returns toward the video display apparatus 1. This light is reflected again on the video display surface of the liquid crystal display panel 11 constituting the video display apparatus 1, so that the ghost images described above are generated and the image quality of the air floating video 3 is significantly deteriorated. Therefore, in the present embodiment, the absorptive polarizing plate 12 is provided on the video display surface of the video display apparatus 1. By transmitting the video light and absorbing the reflected light described above by the absorptive polarizing plate 12, the deterioration in image quality of the air floating video 3 due to the ghost images is prevented.

In order to reduce the deterioration in image quality due to external light such as sunlight or illumination light outside the set of the air floating video display apparatus, the absorptive polarizing plate 12 is preferably provided on the surface of the transparent member 100. Further, since strong ghost images are generated if the external light enters the retroreflector 2, the configuration in which the external light is prevented from entering by a fourth light blocking member 25 is adopted. The polarization separator 101 is formed of a reflective polarizing plate or a metal multilayer film that reflects a specific polarized wave.

A second light blocking member 23 and a third light blocking member 24 configured to block oblique video light other than the normal video light (normal image R1 in FIG. 5) that forms the air floating video 3 are provided together between the polarization separator 101 and the liquid crystal display panel 11. Further, a first light blocking member 22 configured to block oblique video light other than the normal video light is provided also between the retroreflector 2 and the polarization separator 101. Furthermore, as described above, the fourth light blocking member 25 is also provided such that external light does not directly enter the retroreflector 2, whereby oblique lights that generate ghost images are blocked. As a result, the generation of ghost images can be suppressed.

The inventors confirmed by experiment that the light blocking effect can be enhanced by providing the third light blocking member 24 and the second light blocking member 23 between the liquid crystal display panel 11 and the polarization separator 101. In this experiment, the second light blocking member 23 and the third light blocking member 24 could be fabricated and assembled while keeping the part accuracy within the range of mechanical tolerance by setting the inner diameters of the second light blocking member 23 and the third light blocking member 24 to 110% in area with respect to the region through which the normal video light flux forming the air floating video 3 passed. For the further reduction of the generation of ghost images, it was possible to suppress the generation of ghost images to a practically negligible level by setting the inner diameters of the light blocking members to 104% or less with respect to the region through which the normal video light flux passed. On the other hand, the first light blocking member 22 provided between the retroreflector 2 and the polarization separator 101 could further reduce the generation of ghost images by setting the distance L1 between the first light blocking member 22 and the retroreflector 2 to 50% or less with respect to the distance between the retroreflector 2 and the polarization separator 101, and could reduce the generation to a practically negligible level in visual observation by setting the distance L1 to 30% or less. Furthermore, it was possible to further reduce the level of ghost images by providing the second light blocking member 23 and the third light blocking member 24 together with the fourth light blocking member 25 and the first light blocking member 22 provided so as to surround the retroreflector 2.

The cross-sectional shape of each light blocking member in FIG. 6A has approximately the same size as the effective area of the light blocking member with respect to the region through which the normal video light flux that forms the air floating video 3 passes (corresponding to the region through which the video light flux passes in the absorptive polarizing plate 112 in the present embodiment). Also, it is more preferable that the cross-sectional shape of each light blocking member has the configuration in which a beam is provided toward an inner surface and the abnormal light that forms the ghost image is reflected multiple times on the surface of the beam to absorb the abnormal light. The region through which the normal video light flux passes is made smaller with respect to the outer frame of the light blocking member so as to have an area equal to the inscribed surface of the beam.

Meanwhile, the shape of the retroreflector 2 may be changed from a planar shape squarely facing the video display apparatus 1 to a concave surface or a convex surface having a radius of curvature of 200 mm or more. Thereby, even if a ghost image is generated due to the oblique video light reflected by the retroreflector 2, the ghost image can be made invisible by keeping the ghost image generated after reflection away from the field of view of the viewer. However, a new problem arises that the amount of normally reflected light in the light reflected in the periphery of the retroreflector 2 with a radius of curvature of 100 mm or less decreases and the amount of light in the periphery of the obtained air floating video 3 decreases. Therefore, in order to reduce the ghost image to a practically negligible level, it is preferable to select and apply the technical means described above or use them together.

<Air Floating Video Display Apparatus (3)>

Figure 6C:
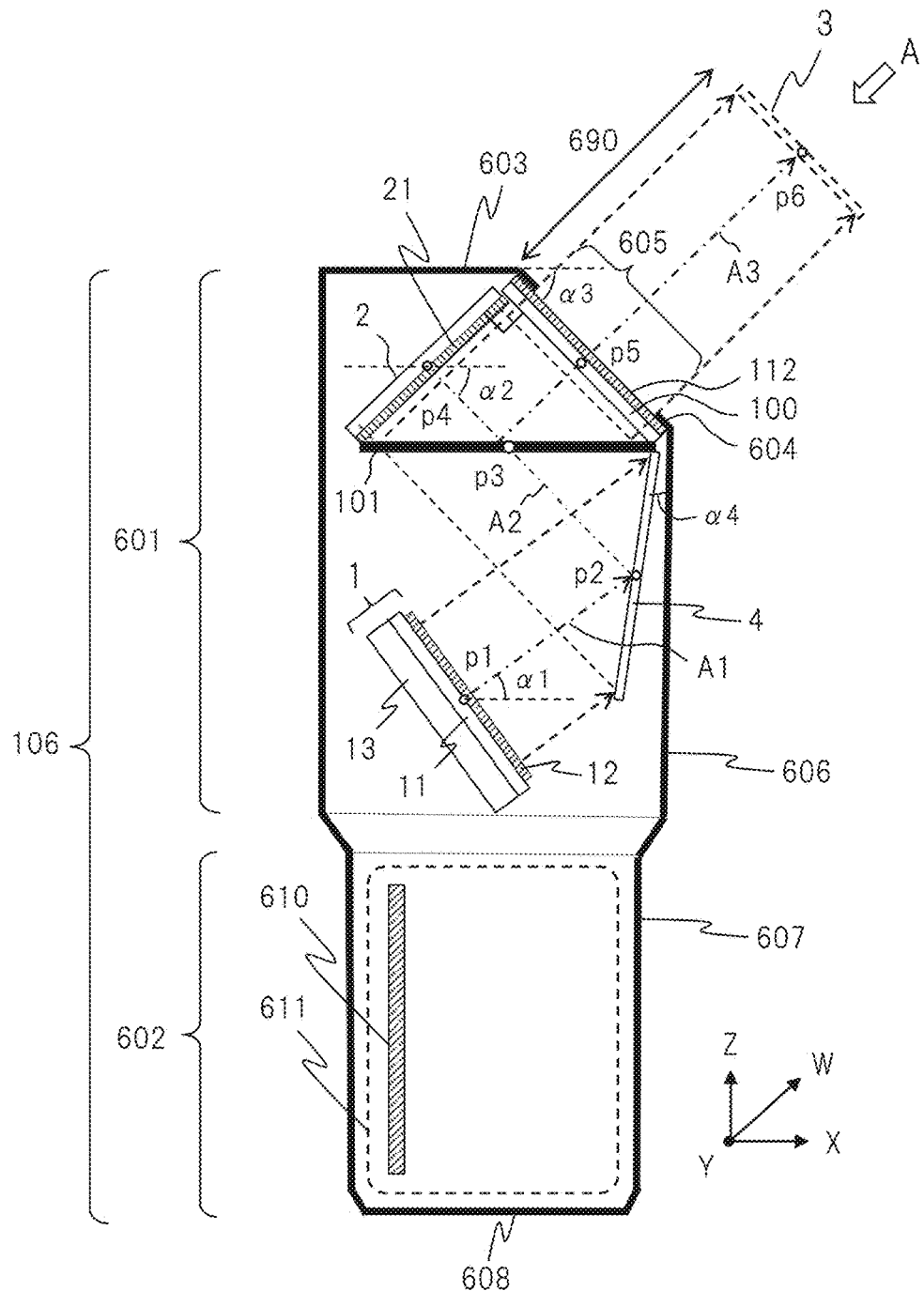
FIG. 6C is a diagram showing a configuration of the main part of the air floating video display apparatus capable of being installed in a bottle holder according to one embodiment of the present invention.

FIG. 6B is a perspective view showing an example of the external appearance of the air floating video display apparatus (third example) according to one embodiment of the present invention. The air floating video display apparatus shown in FIG. 6B has a generally tubular, particularly cylindrical housing 106. The air floating video display apparatus having this cylindrical housing 106 can be stored in a bottle holder (referred to also as a drink holder (FIG. 6D described later)) in a vehicle, and is relatively small (compact) and portable. In this cylindrical shape, the axis of the cylinder extends in the height direction (corresponding to vertical direction, the Z direction in FIG. 6C), and the diameter of the cylinder extends in the direction perpendicular to it (corresponding to horizontal direction, X and Y directions in FIG. 6C). The cylindrical housing 106 is roughly divided into a housing upper portion 601 and a housing lower portion 602, and these are integrally connected. An optical system and a control circuit board which will be described later and a rechargeable battery, etc., as necessary are accommodated in the housing 106.

The cylindrical housing 106 has rigidity, light blocking properties, waterproof properties, etc. Also, the cylindrical housing 106 has not only portions of curved side surfaces 606 and 607 but also portions of an upper surface 603 and a lower surface 608, and the internal space of the housing is closed by these portions.

As an example of the size of the cylindrical housing 106, it has a height of about 20 cm, the housing upper portion 601 on the upper side has a diameter of about 9 cm, and the housing lower portion 602 on the lower side has a diameter of about 7 cm. The size of the air floating video 3 corresponds to the screen size of the liquid crystal display panel 11 and the size of a window portion 605, and can be, for example, 2 to 3 inches. The distance (distance 690 in FIG. 6C) corresponding to the optical path length from the window portion 605 to the formation position of the air floating video 3 is, for example, about 6 cm.

In the present embodiment, the diameter of the housing upper portion 601 is larger than the diameter of the housing lower portion 602. This configuration is designed in consideration that the housing lower portion 602 is stored in the internal space of the bottle holder and the housing upper portion 601 is exposed above the bottle holder. Further, in this configuration, the upper housing portion 601 can accommodate the optical system in a volume larger than that of the lower housing portion 602. As a result, it is easy to arrange a larger element and to secure a longer optical path in the optical system in the housing upper portion 601, and a longer projection distance (distance 690 in FIG. 6C) from the housing 106 (slope 604) to the formation position of the air floating video 3 can be secured. Also, the screen size of the liquid crystal display panel 11 can be made larger, and the size of the air floating video 3 can accordingly be made larger. The relationship between the diameters of the housing lower portion 602 and the housing upper portion 601 is not limited to the above, and the configuration in which the diameter of the housing lower portion 602 and the diameter of the housing upper portion 601 are made equal to each other and the configuration in which the diameter of the housing upper portion 601 is made smaller than the diameter of the housing lower portion 602 are also possible.

As shown in the drawing, the housing upper portion 601 has a shape in which a part of a cylinder including the upper surface 603 and the side surface 606 is obliquely cut out, so that the upper surface 603 like a substantially semicircular region and a slope 604 like a substantially semicircular region are provided. Then, a rectangular window portion (in other words, opening) 605 in which a transparent member 100 and the like are arranged is provided in the slope 604. The window portion (opening) 605 is a portion for emitting video light to the outside. The video light from the optical system in the housing 106 passes through this window portion (opening) 605 and forms the air floating video 3 at a position of a predetermined distance outside the housing 106 as shown in the drawing. Although the shape of the window portion (opening) 605 is rectangular as an example, it is not limited to this, and various shapes such as a circle, an ellipse, and a polygon are possible.

In the present embodiment, the angle of the slope 604 and the window portion 605 is, for example, about 45° with respect to the upper surface 603 (angle α3 in FIG. 6C). Correspondingly, the optical axis of the air floating video 3 (optical axis A3 in FIG. 6C) is directed obliquely upward (direction W in FIG. 6C) at about with respect to the horizontal plane. The arrangement angles and directions of the slope 604 and the optical axis are designed in consideration that they can be easily directed to the face of the driver when the air floating video display apparatus is installed in the bottle holder (FIG. 6D) in the vehicle. The arrangement angles and directions of the slope 604 and the optical axis are not limited to the above. For example, the angle α3 and the elevation angle of the optical axis A3 may be set within a predetermined angle range (for example, 45°±15°).

FIG. 6C shows an example of the internal configuration of the portable air floating video display apparatus shown in FIG. 6B. The optical system for generating the air floating video 3 is mainly accommodated in the housing upper portion 601, and a control board 610 and a rechargeable battery 611 are mainly accommodated in the housing lower portion 602. The control board 610 and the elements of the video display apparatus 1 and the like of the optical system are connected to each other by signal lines and the like.

The optical system for generating the air floating video 3 with high visibility without ghost images is provided in the housing upper portion 601. The optical system in the housing upper part 601 includes the video display apparatus 1 (the light source apparatus 13, the liquid crystal display panel 11, and the absorptive polarizing plate 12 in FIG. 6C), a plane mirror 4, a beam splitter (in other words, the polarization separator) 101, the retroreflector 2, the λ/4 plate 21 as a retardation plate, the transparent member 100, and the absorptive polarizing plate 112.

The rechargeable battery 611 in the housing lower portion 602 is a rechargeable battery such as a lithium ion battery and a power supply circuit. The control board 610 is a control circuit board constituting a video controller, a video/audio signal transmitter/receiver, and the like, and includes a processor, a memory, an interface, and the like. In other words, the control board 610 is a controller of the air floating video display apparatus. The control board 610 is arranged vertically, for example, in a partial region inside the housing lower portion 602. The control board 610 may have a communication interface function, and may transmit/receive data to/from the Internet or the like.

The lower housing portion 602 of the housing 106 is stored in a bottle holder. In the air floating video display apparatus having the housing 106 with a vertically long cylindrical shape, the optical system is accommodated in the housing upper portion 601, and the rechargeable battery 611 and the like which are relatively heavier than the optical system are accommodated in the housing lower portion 602. The center of gravity of the whole air floating video display apparatus exists on the lower side. Therefore, the air floating video display apparatus can be stably held in the bottle holder. In addition, this air floating video display apparatus is relatively stable against vibrations such as shaking of the vehicle.

Further, in the present embodiment, the length of the housing upper portion 601 in the height direction is larger than the length of the housing lower portion 602 in the height direction. The length of the housing upper portion 601 in the height direction is limited to a certain length in consideration of stably holding the apparatus in the state where the housing lower portion 602 is stored in the bottle holder.

Also, an input/output terminal 5 is provided at a location of, for example, the side surface 606 of the housing upper portion 601 of the housing 106. The input/output terminal 5 is connected to the control board 610. The input/output terminal 5 is a power supply input and signal input/output terminal or a USB terminal, for example, but is not limited thereto. This input/output terminal is provided as a terminal for supplying power from, for example, a cigarette lighter socket of a vehicle and as a terminal for taking in various types of information including the video signal output as the air floating video 3 (concierge, etc.). The control board 610 supplies the video signal input from the outside through the input/output terminal 5 to the video display apparatus 1. Alternatively, the video signal input from the outside through the input/output terminal 5 may be directly supplied to the video display apparatus 1.

Note that the input/output terminal 5 may be provided as a plurality of input/output terminals by dividing it into a power input terminal and a signal input/output terminal. The position of the input/output terminal 5 may be any location on the housing 106. The position of the input/output terminal 5 may be one location on the upper surface 603 or one location on the side surface 607 of the housing lower portion 602. In the present embodiment, the input/output terminal 5 of the housing upper portion 601 can be easily handled even when the housing lower portion 602 is stored in the drink holder.

An in-vehicle power supply can be connected to the input/output terminal 5. An external power supply input from an in-vehicle power supply (for example, a cigarette lighter socket) is supplied to the rechargeable battery 611 through the input/output terminal 5, and the rechargeable battery 611 is charged. The rechargeable battery 611 supplies power to each unit of the control board 610 and the like. Note that the air floating video display apparatus is small, and thus a dry battery may be used instead of the rechargeable battery 611. Input information from the outside such as input information from a car navigation system is input to the control board 610 through the input/output terminal 5. Based on the input information, the control board 610 creates a video such as a concierge to be displayed as the air floating video 3 and a corresponding voice, and controls the video display apparatus 1 and the like.

This air floating video display apparatus can perform also the voice control. A device such as a microphone or a speaker may be connected to the input/output terminal 5 of the housing 106, or a controller of a car navigation system or an in-vehicle system may be connected thereto. A user's smartphone or the like may also be connected thereto. In that case, the voice input/output control is possible based on the control through the microphone or the like by the control board 610. Namely, the control board 610 can receive the input of the voice uttered by the driver and the like through the microphone or the like, recognize the input voice, and perform the processing corresponding to the recognized predetermined instruction (for example, turning on/off of the display). Further, in addition to displaying the air floating video 3, the control board 610 can read the voice associated with the air floating video 3 (for example, the voice that the concierge utters) or create it by the voice synthesis function, and output it to the driver and the like from the speaker etc. The configuration is not limited to the above, and a configuration in which a microphone, a speaker, and the like are mounted on the housing 106 of the air floating video display apparatus may also be possible.

Figure 6D:
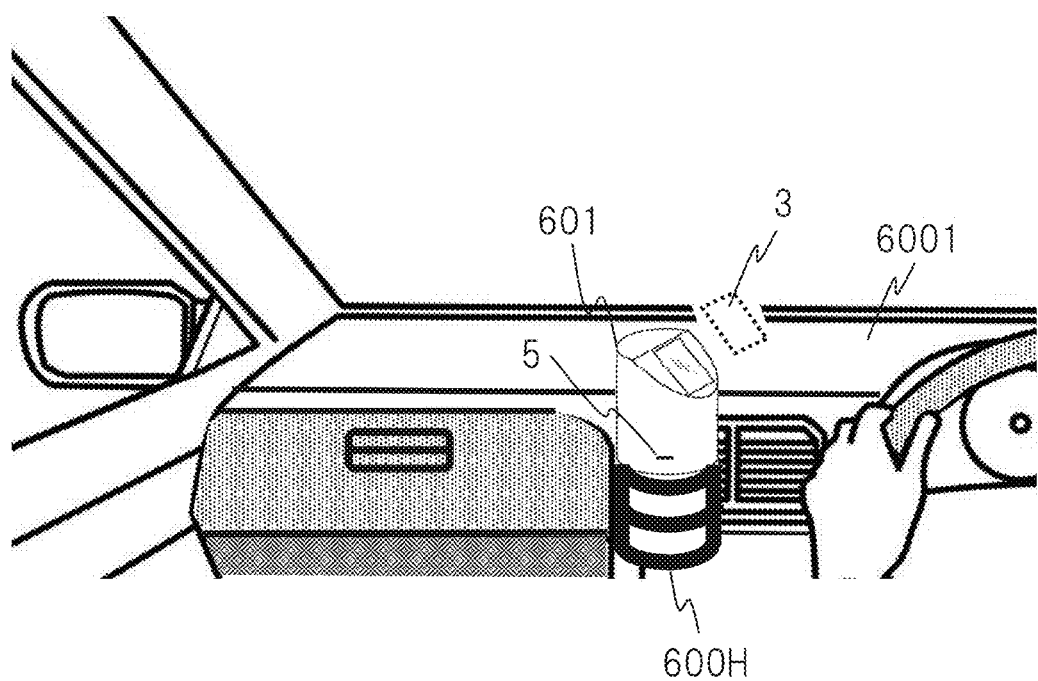
FIG. 6D is a diagram showing an example of the state of the air floating video display apparatus installed in the bottle holder according to one embodiment of the present invention.

FIG. 6D shows an appearance example when the portable air floating video display apparatus according to the present embodiment is installed in a cylindrical bottle holder 600H in a vehicle. A person such as a driver or a fellow passenger in the vehicle inserts the housing lower portion 602 into the bottle holder 600H in the vehicle to install the air floating video display apparatus. The housing upper portion 601 is projected upward from the bottle holder 600H, and the video light emitted from the window portion 605 forms the air floating video 3.

In the example of FIG. 6D, in the vicinity of the center of the dashboard 6001 of the vehicle in the horizontal direction, the bottle holder 600H is provided near the air conditioner above the part where the car navigation system and the like are arranged, and the air floating video display apparatus is installed in the bottle holder 600H. In this example, the orientation of the window portion 605 of the air floating video display apparatus in the bottle holder 600H (that is, the direction of the optical axis of the video light, the orientation of the air floating video 3) is adjusted so as to be directed to the face and eyes of the driver in the driver's seat on the right side. This orientation can be adjusted by, for example, rotating the cylindrical housing 106 in the bottle holder 600H. When the fellow passenger visually confirms the air floating video 3, the orientation of the window portion 605 may be adjusted so as to be directed to the face and eyes of the fellow passenger.

The bottle holder 600H is not limited to the in-vehicle type in general, and there are various types of bottle holders such as a detachable type. Therefore, the air floating video display apparatus can be installed in the bottle holder at various positions other than that of the case shown in the drawing.

In FIG. 6C, in the air floating video display apparatus, the configuration of the optical system in the housing 106 is designed in accordance with the shape of the cylindrical housing 106 suitable for installation in the bottle holder 600H. Each element of the optical system is arranged so as to correspond to the space that is long in the height direction inside the cylindrical housing 106 (especially the housing upper portion 601), and the optical system that secures an optical path as long as possible in the height direction is configured by bending the optical path by the plane mirror 4.

In FIG. 6C, the video display apparatus 1, the plane mirror 4, the beam splitter 101, the retroreflector 2, the transparent member 100, and the like are arranged in this order from the bottom to the top approximately in the height direction in the housing upper portion 601. Each element is fixed to the housing upper portion 601 in a predetermined relationship. More specifically, for example, the beam splitter 101, the retroreflector 2, and the transparent member 100 (installed in the window portion 605) are arranged such that each one side thereof is in contact with each other or each one side thereof is adjacent to each other at a predetermined interval. The housing 106 has a shape that is longer in the height direction than in the radial direction, and each element constituting the optical system is arranged as shown in the drawing so as to secure the optical path of the video light as long as possible in the height direction. The video display apparatus 1, the plane mirror 4, the retroreflector 2, and the like are arranged in a state of being inclined with respect to the height direction and the like. The video display apparatus 1 is arranged at an angle $\alpha 1$. The retroreflector 2 is arranged at an angle $\alpha 2$. The beam splitter 101 is arranged horizontally. The slope 604 and the transparent member 100 are arranged at an angle $\alpha 3$. The plane mirror 4 is also arranged at an angle $\alpha 4$ such that the flat plane is slightly inclined with respect to the vertical plane. The optical path of the video light in this optical system is the optical path reflected by the plane mirror 4. The optical path of the video light in this optical system is the optical path in which the beam splitter 101 is arranged between the plane mirror 4 and the retroreflector 2.

The optical path of the video light in this optical system starts from the video display apparatus 1 sequentially through the plane mirror 4, the beam splitter 101, the $\lambda/4$ plate 21, the retroreflector 2, the $\lambda/4$ plate 21, the beam splitter 101, the transparent member 100, and the absorptive polarizing plate 112 to reach the air floating video 3. Points p1 to p6 are examples of the points through which the video light passes on the optical path. The point p1 is the reference point (for example, the center point) of a video emission surface of the liquid crystal display panel 11. The point p2 is the reference point of the plane mirror 4. The point p3 is the reference point of the beam splitter 101. The point p4 is the reference point of the retroreflector 2. The point p5 is the reference point of the transparent member 100. The point p6 is the reference point of the air floating video 3. This air floating video 3 can be visually recognized most preferably when viewed by the user's eyes from the direction of the arrow A corresponding to the optical axis A3 (the direction squarely facing the video plane).

Figure 6E:
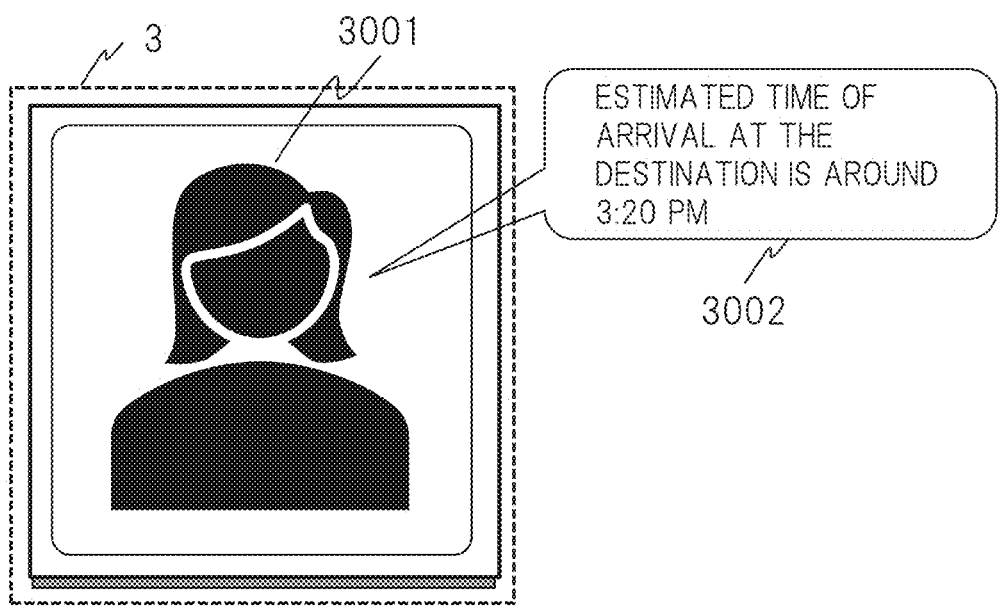
FIG. 6E is a diagram showing an example of an air floating video.

The air floating video display apparatus shown in FIG. 6B and the like generates the air floating video 3 at the position of a predetermined distance located obliquely above the housing 106. As the air floating video 3, for example, the face of a person (concierge) who provides the driver of the vehicle with navigation information and POI information existing around the vehicle by video and sound (voice) is displayed. FIG. 6E schematically shows a display example of the concierge in the air floating video 3 when seen from the driver. The air floating video 3 has, for example, a predetermined maximum size in a rectangular region, and an image 3001 of the concierge is displayed in this region. The image 3001 may be a moving image or a still image. In addition, in accordance with the display of the image 3001, a voice 3002 (for example, a guidance for the estimated time of arrival at the destination) uttered by the concierge is output from a speaker (an in-vehicle speaker or a speaker accommodated in the housing 106 of the air floating video display apparatus) or the like.

In FIG. 6C, the video display apparatus 1 includes the liquid crystal display panel 11 as a video display element and the light source apparatus 13 configured to generate a light of a specific polarized wave with narrow-angle diffusion characteristics. Here, the liquid crystal display panel 11 has a small screen size of about 2 to 3 inches. In the present embodiment, the video display apparatus 1 has the configuration in which the absorptive polarizing plate 12 is further provided on the video display surface of the video display apparatus 1. Alternatively, the video display apparatus 1 has the configuration in which an antireflection film (not shown) is further provided on the video emission surface of the absorptive polarizing plate 12 provided on the surface of the video display apparatus 1, whereby the light of the ghost image is transmitted through the antireflection film and absorbed by the absorptive polarizing plate 12 and the decrease in image quality due to the ghost image can be prevented.

The internal configuration and features of the portable air floating video display apparatus will be described in detail with reference to FIG. 6C. The video display apparatus 1 composed of the liquid crystal display panel 11, the absorptive polarizing plate 12, and the light source apparatus 13 is arranged and fixed with respect to the housing 106 at a predetermined angle (the optical axis is at an angle α1 with respect to the horizontal plane) as shown in the drawing. The light source apparatus 13 functions as a backlight that supplies illumination light with narrow-angle diffusion characteristics to the liquid crystal display panel 11. The video light from the video display apparatus 1 (point p1 with respect to the optical axis) is reflected on the plane mirror 4 (point p2) to change direction and enters the beam splitter 101 (point p3). The video light further transmits through the beam splitter 101 (point p3) and travels directly toward the retroreflector 2 (point p4).

Figure 8:
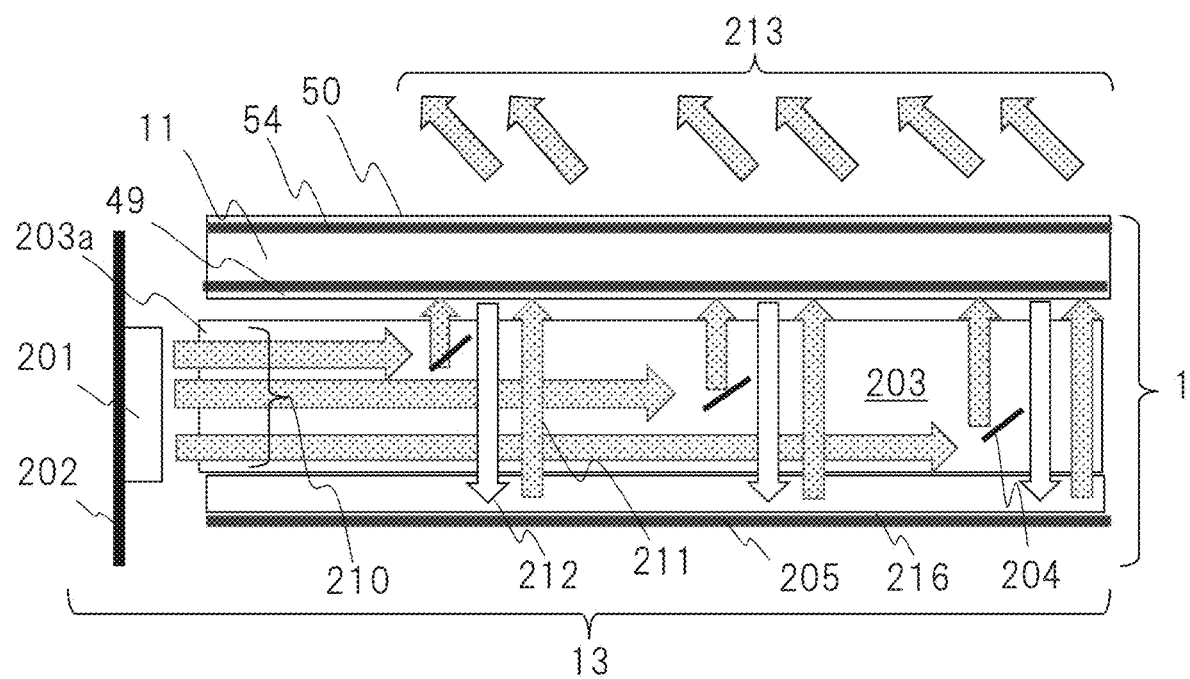
FIG. 8 is a cross-sectional view showing an example of a specific configuration of the light source apparatus.
Figure 9:
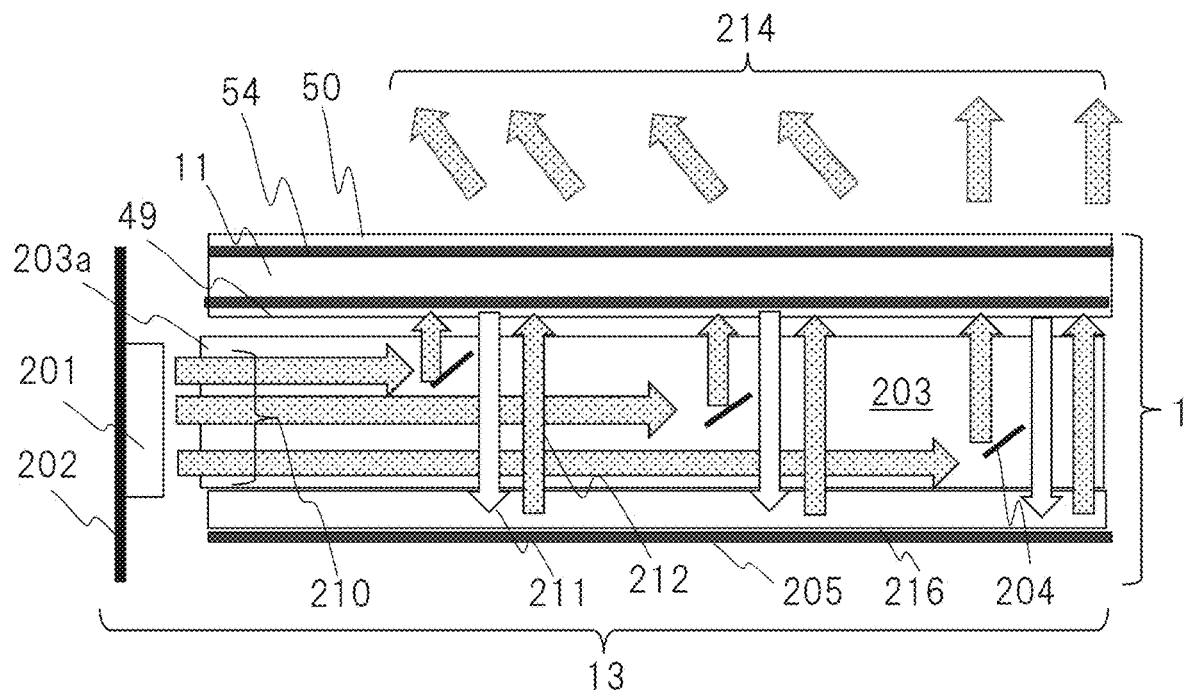
FIG. 9 is a cross-sectional view showing an example of a specific configuration of the light source apparatus.

Although described later with reference to FIG. 8 and FIG. 9, the light source light from the light source apparatus 13 is either the S-polarized light (vertically polarized light) (FIG. 8) or the P-polarized light (parallelly polarized light) (FIG. 9). In both cases, the light source light from the light source apparatus 13 functions as a backlight for the liquid crystal display panel 11. Correspondingly, the video light emitted from the video display apparatus 1 (liquid crystal display panel 11) (that is, the video light based on the light source light and modulated by the signal of the video source in the liquid crystal display panel 11) is either the S-polarized light or the P-polarized light. In the following, first, the case where the video light from the video display apparatus 1 is the video light with the characteristics of P-polarized light will be described.

The video light (P-polarized light) that has been emitted from the liquid crystal display panel 11 and has transmitted through the absorptive polarizing plate 12 once travels toward the plane mirror 4 along the optical axis A1. Then, the video light (P-polarized light) is reflected on the plane mirror 4 and travels toward the beam splitter 101 along the optical axis A2.

The beam splitter (polarization separator) 101 has a polarization separation function, and is an element with a characteristic structure that transmits the light when the video light from the liquid crystal display panel 11 having the light source apparatus 13 as a backlight, that is, the video display apparatus 1 is the P-polarized light and reflects (in other words, does not transmit) the light when the video light is the S-polarized light. The beam splitter 101 like this is formed of a reflective polarizing plate or a multilayer film that reflects a specific polarized wave. The multilayer film of the present embodiment is a metal multilayer film.

Next, the video light (for example, P-polarized light) that has transmitted through the beam splitter 101 travels toward the retroreflector 2. The λ/4 plate 21 is provided on the light incident surface of the retroreflector 2. The video light (P-polarized light) from the beam splitter 101 as the video light (P-polarized light) from the video display apparatus 1 passes through the λ/4 plate 21 twice at the time of entering the retroreflector 2 and at the time of emission after reflection. Thereby, the video light is subjected to polarization conversion from one polarized wave to the other polarized wave. Specifically, the P-polarized light is converted into the S-polarized light. As a result, the video light reflected by the retroreflector 2 becomes the video light with the characteristics of S-polarized light (video light with polarization characteristics different from the original video light) and travels toward the beam splitter 101. The video light (S-polarized light) is reflected by the beam splitter 101 and travels toward the transparent member 100 along the optical axis A3. The video light (S-polarized light) transmits through the transparent member 100 and the absorptive polarizing plate 112 of the window portion 605 to the outside, and the air floating video 3 which is a real image is generated and displayed at a position of the predetermined distance 690 outside the window portion 605.

Alternatively, an embodiment in which the video light from the video display apparatus 1 is the S-polarized light contrary to the above embodiment will be described as follows. The S-polarized light which is the video light emitted from the video display apparatus 1 is reflected by the plane mirror 4 and travels toward the beam splitter 101. The beam splitter 101 in this case is an element with a characteristic structure that transmits the video light (S-polarized light) from the video display apparatus 1 and reflects the P-polarized light. The video light (S-polarized light) from the beam splitter 101 is subjected to polarization conversion to be the P-polarized light by being reflected on the retroreflector 2 and passing through the λ/4 plate 21 twice. This video light (P-polarized light) is reflected by the beam splitter 101, travels toward the transparent member 100, passes through the transparent member 100 and the like, and forms the air floating video 3.

The design related to the video light and the polarization such as the beam splitter 101 is possible in any embodiment. When the video light from the video display apparatus 1 is the S-polarized light, there is an advantage that the reflectance of the plane mirror 4 becomes higher. When the video light from the video display apparatus 1 is the P-polarized light, there is an advantage that it is easy to visually recognize the air floating video 3 even when the user wears polarized sunglasses.

Here, it is known that, when the portable air floating video display apparatus according to the present embodiment is installed in a vehicle, most of the S-polarized light (about 80%) of external light (sunlight or external illumination light) entering from the outside of the vehicle is reflected by the windshield (front glass), and the external light entering the interior of the vehicle contains a large amount of the P-polarized component. Therefore, it is preferable to provide the absorptive polarizing plate 112 on the external light incident surface of the transparent member 100.

The window portion 605 transmits the video light. The transparent member 100 is provided in the window portion 605 and is composed of a glass plate or the like. Further, the absorptive polarizing plate 112 is provided on the external light incident surface of the transparent member 100. The transparent member 100 and the absorptive polarizing plate 112 are arranged in a part of the window portion 605 of the slope 604 through which the video light passes, and the other part (that is, a part of the housing 106) is composed of a light blocking member such that external light does not enter the housing 106. The size of the window portion 605 and the size of the air floating video 3 correspond to each other. Note that a part of the transparent member 100 of the window portion 605 (a part through which the video light passes) may be formed of a transparent material, and the other part may be formed of a light blocking member.

The absorptive polarizing plate 112 is provided on the outer surface of the transparent member 100 in order to reduce the deterioration in image quality due to external light such as sunlight and illumination light from the outside of the housing 106 that accommodates the video display apparatus 1 and other optical components. Most of the external light is absorbed by the absorptive polarizing plate 112 and is less likely to enter the housing upper portion 601.

In the beam splitter (polarization separator) 101, the polarization axes are not aligned due to the retroreflection of the light in some cases, and thus a part of the video light is reflected and returns to the video display apparatus 1. This light is reflected again by the video display surface of the liquid crystal display panel 11 constituting the video display apparatus 1, thereby generating the above-described ghost image and significantly deteriorating the image quality of the air floating video 3. Therefore, in the present embodiment, the absorptive polarizing plate 12 is further provided on the video display surface of the video display apparatus 1. Alternatively, the video display apparatus 1 has the configuration in which an antireflection film (not shown) is further provided on the video emission surface of the absorptive polarizing plate 12 provided on the surface of the video display apparatus 1, whereby the light of the ghost image is transmitted through the antireflection film and absorbed by the absorptive polarizing plate 12 and the deterioration in image quality due to the ghost image can be prevented.

When external light directly enters the retroreflector 2, a strong ghost image may be generated. Therefore, in the present embodiment, as shown in FIG. 6C, the retroreflector 2 is inclined obliquely downward at an angle α2, and the transparent member 100 of the window portion 605 and the retroreflector 2 (in particular, the retroreflection surface) are arranged so as to have a relationship of about 90 degrees as shown in the drawing. The main incident direction of the external light component entering the interior through the transparent member 100 of the window portion 605 from the outside is set to the same direction as the optical axis A3 of the video light (the direction perpendicular to the surface of the transparent member 100). In this case, the retroreflector 2 and the λ/4 plate 21 are arranged such that the direction of the optical axis of the retroreflector 2 (direction perpendicular to the surface) has a relationship of about 90 degrees. In other words, the retroreflector 2 and the λ/4 plate 21 are arranged such that the retroreflection surface of the retroreflector 2 and the surface of the transparent member 100 have a relationship of about 90 degrees. As described above, since the retroreflector 2 is inclined downward (about 90 degrees in FIG. 6C) with respect to the window portion 605 through which the external light enters, the external light component is less likely to directly enter the retroreflector 2 even when the external light component enters the housing upper portion 601. In this way, the generation of the strong ghost image can be prevented by the configuration of the optical system for preventing the external light from entering.

Further, the video display apparatus 1 is also arranged at a position away from the window portion 605 with the beam splitter 101 and the plane mirror 4 interposed therebetween. The video display apparatus 1 is arranged at a position where the video light with the optical axis A1 emitted from the video display apparatus 1 cannot be visually recognized through the window portion 605 from the direction of the arrow A (optical axis A3). Thereby, the generation of the ghost image is further reduced.

In FIG. 6C, the optical path length of the optical path from the point p1 of the video display apparatus 1 to the point p3 of the beam splitter 101 via the point p2 of the plane mirror 4 and the optical path length of the optical path from the point p3 of the beam splitter 101 to the point p6 of the air floating video 3 are correlated with each other. If the distance 690 for forming the air floating video 3 outside the window portion 605 is secured to some extent, the sense of floating of the air floating video 3 can be enhanced. Therefore, in the present embodiment, as the optical system to be accommodated and arranged in the small and vertically long housing 106, each element is arranged to be inclined obliquely and the plane mirror 4 is provided, whereby the optical path length from the video display apparatus 1 to the beam splitter 101 is secured as long as possible.

As described above, the small and portable air floating video display apparatus according to the present embodiment can be suitably installed in a bottle holder or the like in a vehicle, and can suitably provide the air floating video 3 of the concierge or the like to the driver and the like. The cylindrical housing 106 can be suitably installed in a bottle holder that is standardly equipped in a general vehicle or a bottle holder of a detachable type. A user can easily attach and detach the air floating video display apparatus to and from a bottle holder or similar container or space as required. Further, since the input/output terminal 5 is provided in the housing 106 of the air floating video display apparatus, power can be supplied to the rechargeable battery 611 from a power supply such as a cigarette lighter socket of the vehicle. Therefore, this apparatus can be charged at all times even while the vehicle is running, and there is no concern about running out of the battery even if it is used for a long period of time.

The air floating video 3 formed by the air floating video display apparatus according to the present embodiment has directivity related to the viewing direction as described above. In order for the driver and passengers in the vehicle to be able to appropriately view the bright video when they view the air floating video 3, it is most desirable that they view the air floating video 3 from the direction in which they squarely face it (the direction along the optical axis A3) as indicated by the arrow A in FIG. 6C. Within the absolute spatial coordinate system, the orientation of this air floating video 3 (optical axis A3) depends also on the states such as the position and orientation of this apparatus installed in the drink holder. Also, the relative orientation when the driver or the like views the air floating video 3 depends on the relationship between the position and orientation of the air floating video 3 (optical axis A3) and the position and orientation of the face and eyes of the driver.

Therefore, in the present embodiment, assuming a bottle holder (FIG. 6D) having an opening on an upper side in the vertical direction, the window portion 605 of the slope 604 and the corresponding optical system are designed such that the air floating video 3 can be easily adjusted so as to be directed to the face and eyes of the driver when the air floating video display apparatus is installed in the bottle holder. Namely, the window portion 605 of the slope 604 is formed at about 45 degrees, and the optical axis A3 of the air floating video 3 is oriented obliquely upward at about degrees. Thereby, when viewing the air floating video 3, the driver or the like can easily view the air floating video 3 as a bright video squarely without moving the head or the like so much.

If the direction of the video light emitted from the air floating video display apparatus is the vertical direction or the horizontal direction, for example, the driver or the like needs to look into it by moving the head or the like according to the direction of the video light in order to appropriately view the air floating video squarely. According to the present embodiment, there is no such need, and the bright air floating video 3 can be viewed in a relatively natural posture even while driving.

Figure 6F:
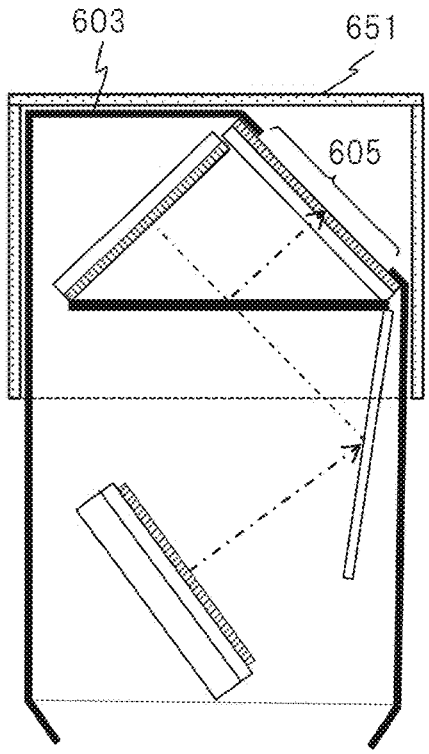
FIG. 6F is a diagram showing configuration examples of a lid of the air floating video display apparatus capable of being installed in the bottle holder according to one embodiment of the present invention.
Figure 6F:
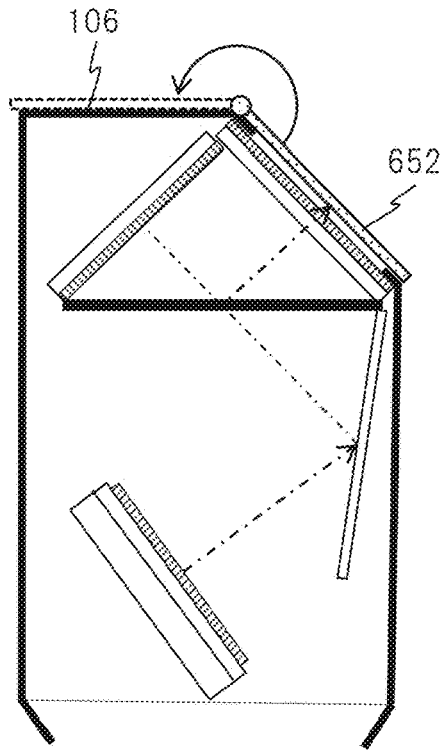
Figure 6F:
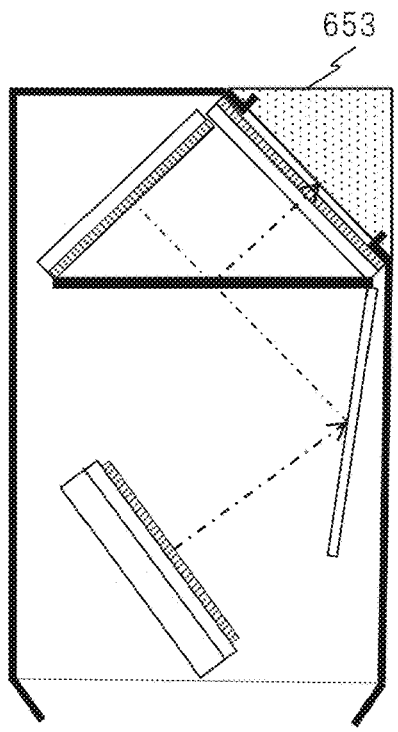

FIG. 6F shows configuration examples in which a lid is provided to the housing 106 as modifications of the above embodiment. In (A) of FIG. 6F, a lid 651 like a bottle cap is provided on the housing upper portion 601 such that the upper surface 603 and the window portion 605 can be hidden in accordance with the operation of the user. The lid 651 is attached as shown in the drawing when the air floating video display apparatus is not used, whereby it is possible to prevent the window portion 605 from being scratched or prevent the dust from being attached, and further increase the strength of the housing 106. When using the air floating video display apparatus, the lid 651 is removed.

In (B) of FIG. 6F, a lid 652 is provided on the window portion 605 in the housing upper portion 601 as another configuration example. The shape of the lid 652 is, for example, a flat plate. One side of the lid 652 is connected to a hinge provided on the side where the upper surface 603 and the slope 604 (FIG. 6B) are in contact with each other, and rotates around the hinge as a rotation axis in accordance with the operation of the user. The window portion 605 is hidden by the lid 652 as shown in the drawing when the air floating video display apparatus is not used, whereby it is possible to prevent the window portion 605 from being scratched or prevent the dust from being attached, and further increase the strength of the housing 106. When the air floating video display apparatus is used, the lid 652 is rotated as indicated by an arrow to be placed on the upper surface 603 and the window portion 605 is opened.

In (C) of FIG. 6F, a lid 653 is provided on a space region obtained by cutting out a part of the cylinder near the window portion 605 in the housing upper portion 601 as another configuration example. The lid 653 may have a structure that rotates in the same manner as the lid 652, but may also have a structure that is attached to projections or the like provided on a surface of the slope 604 other than the window portion 605 as shown in the drawing. The window portion 605 is hidden by the lid 653 as shown in the drawing when the air floating video display apparatus is not used, whereby it is possible to prevent the window portion 605 from being scratched or prevent the dust from being attached, and further increase the strength of the housing 106. When the air floating video display apparatus is used, the lid 653 is removed and the window portion 605 is opened. Further, the housing 106 of the air floating video display apparatus may be provided with not only a lid but also a handle for carrying.

The following configuration is also possible as a modification. That is, the shape of the housing 106 is not limited to a cylindrical shape, and various cross-sectional shapes in the horizontal plane are possible. For example, a rectangular shape (or polygonal shape) may be adopted as the cross-sectional shape of the housing 106, thereby forming the housing 106 with a rectangular parallelepiped shape. In the case of the cylindrical housing 106 of the present embodiment, there is an advantage that it can be fittingly accommodated in a cylindrical bottle holder. When the rectangular parallelepiped housing 106 is adopted as a modification, there is an advantage that it is easy to manufacture and easy to hold.

In the configuration example of FIG. 6C, the beam splitter 101, the retroreflector 2, and the transparent member 100 of the window portion 605 are arranged such that their sides are in contact with each other like a triangle in consideration of further size reduction. Without being limited to this, in consideration of a longer optical path length, the arrangement in which the sides of these elements are spaced apart from each other may also be adopted.

In the above embodiment, the case of being mounted on a vehicle has been shown, but the portable air floating video display apparatus can be used in various places without being limited to this because it can be carried by the user. For example, in the user's home or the like, it can be used by similarly installing it in a container or the like other than the bottle holder. Moreover, the air floating video display apparatus can be used even when it is simply placed on a desk or the like without being installed in a container.

The air floating video display apparatus may use a super directional speaker as the speaker. The super directional speaker is a speaker that outputs super directive sound such that the output sound can be heard only in a specific space region near the ears of the user. In addition, the air floating video display apparatus may have a configuration including a camera and a distance measuring sensor, with which a touch operation or the like by the finger or the like of the user to the air floating video 3 is detected and predetermined processing is performed according to the detection. Further, the air floating video display apparatus may be configured to detect the presence or absence of the user based on the camera image or sensor detection, or perform user authentication by analyzing and identifying the user's face or the like. In addition, the air floating video display apparatus may be configured to read a code such as a bar code from a card or paper based on the camera image or the like when the card or paper is held over the air floating video 3, and perform the processing according to the code.

Further, as a modification, similarly to the light blocking member in FIG. 6A described above, a light blocking member for preventing the video light having a divergence angle exceeding a specific angle from the liquid crystal display panel 11 from entering the retroreflector 2 may be arranged in the space connecting the video display apparatus 1 and the retroreflector 2 via the beam splitter 101 (for example, the space below the beam splitter 101).

The light source apparatus 13 in the present embodiment is preferably configured as follows (details will be described later). That is, the light source apparatus 13 includes a point or plane shaped light source, an optical element for reducing the divergence angle of the light from the light source, a polarization converter for aligning the light from the light source into polarized light in a specific direction, and a light guide having a reflection surface that propagates the light from the light source to the liquid crystal display panel 11, and has a configuration in which light is controlled by the shape and surface roughness of the reflection surface of the light source apparatus 13, whereby the video light flux having a narrow divergence angle is emitted as the video light from the liquid crystal display panel 11.

In addition, in the present embodiment, the blur amount in the air floating video 3 is reduced and the visibility is improved by reducing the surface roughness of the retroreflection surface of the retroreflector 2 to a predetermined value or less per unit length. For example, the surface roughness of the retroreflection surface is set to 160 nm or less.

<Reflective Polarizing Plate>

When the reflective polarizing plate having the grid structure is used as the beam splitter 101 in the present embodiment, the characteristics for the light from the direction perpendicular to the polarization axis are deteriorated. Therefore, the specification along the polarization axis is desirable, and the light source apparatus of the present embodiment capable of emitting the video light from the liquid crystal display panel 11 at a narrow angle is an ideal light source. Similarly, the characteristics in the horizontal direction are also deteriorated for oblique light. In consideration of the above characteristics, a configuration example of the present embodiment in which a light source (light source apparatus 13) capable of emitting video light from the liquid crystal display panel 11 at a narrower angle is used as a backlight of the liquid crystal display panel 11 will be described below. Thereby, a high-contrast air floating video 3 can be provided.

<Video Display Apparatus>

Figure 7:
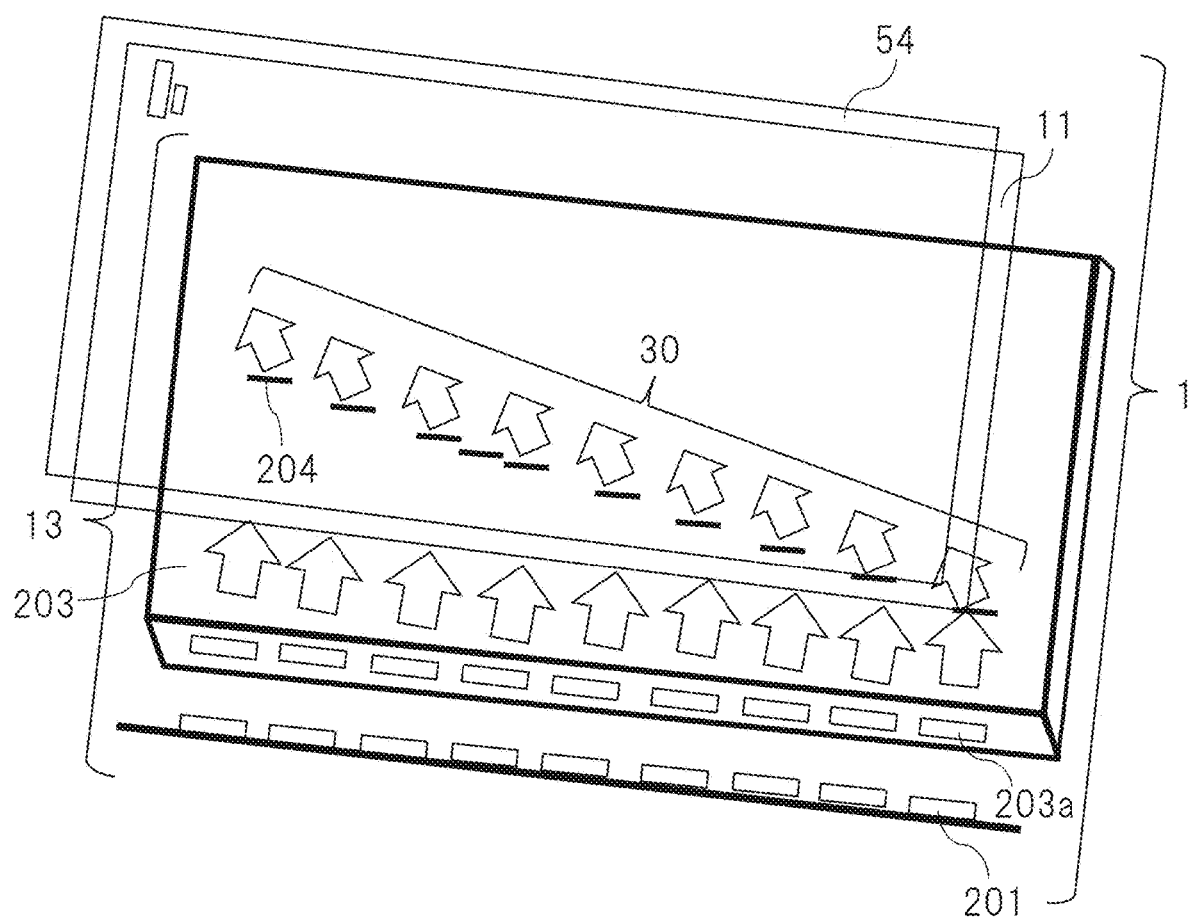
FIG. 7 is a cross-sectional view showing an example of a specific configuration of a light source apparatus.

Next, the video display apparatus 1 of the present embodiment in FIG. 1 will be described with reference to FIG. 7. The video display apparatus 1 of the present embodiment includes the liquid crystal display panel 11 as a video display element and the light source apparatus 13 constituting a light source of the liquid crystal display panel 11. FIG. 7 shows the light source apparatus 13 together with the liquid crystal display panel 11 as a developed perspective view.

In this liquid crystal display panel 11, as indicated by arrows 30 in FIG. 7, an illumination light flux having narrow-angle diffusion characteristics, that is, characteristics similar to laser light with strong directivity (in other words, straightness) and a polarization plane aligned in one direction is obtained by the light from the light source apparatus 13 as a backlight apparatus, and the video light modulated in accordance with an input video signal is emitted. Thereby, as shown in FIG. 1, the emitted video light is reflected by the retroreflector 2 and transmitted through the window glass 105, thereby forming the air floating video 3 as a real image.

Further, in FIG. 7, the video display apparatus 1 includes the liquid crystal display panel 11, a light direction conversion panel 54 configured to control the directional characteristics of the light flux emitted from the light source apparatus 13, and a narrow-angle diffusion plate as needed (not shown). Namely, polarizing plates are provided on both surfaces of the liquid crystal display panel 11, and video light of a specific polarized wave is emitted at the light intensity modulated by the video signal as indicated by the arrows 30 in FIG. 7. Thereby, the video display apparatus 1 projects a desired video as the light of a specific polarized wave having high directivity (straightness) toward the retroreflector 2 via the light direction conversion panel 54, and forms the air floating video 3 by reflecting the light by the retroreflector 2 toward the eyes of an observer outside the space of the store in FIG. 1. Note that a protective cover 50 (see FIG. 8 and FIG. 9) may be provided on the surface of the light direction conversion panel 54 described above.

In the present embodiment, in order to improve the utilization efficiency of the light flux emitted from the light source apparatus 13 indicated by the arrows 30 in FIG. 7 and significantly reduce power consumption, in the video display apparatus 1 including the light source apparatus 13 and the liquid crystal display panel 11, the directivity of the light indicated by the arrows 30 from the light source apparatus 13 can also be controlled by a transparent sheet (not shown) provided on the surface of the window glass 105 such that the air floating video 3 can be formed at a desired position after the light is projected toward the retroreflector 2 in FIG. 1 and reflected by the retroreflector 2. Specifically, this transparent sheet controls the imaging position of the air floating video while providing high directivity by an optical component such as a Fresnel lens or a linear Fresnel lens. According to this, the video light from the video display apparatus 1 efficiently reaches an observer outside the window glass 105 (e.g., a sidewalk) with high directivity (straightness) like laser light, and as a result, it is possible to display a high-quality air floating video with high resolution and to significantly reduce power consumption of the video display apparatus 1 including an LED (Light Emitting Diode) element 201 of the light source apparatus 13.

<Example of Video Display Apparatus (1)>

FIG. 8 shows another example of the video display apparatus 1. FIG. 8 shows the state in which the liquid crystal display panel 11 and the light direction conversion panel 54 are arranged on the light source apparatus 13 in FIG. 7. The light source apparatus 13 is formed of, for example, plastic or the like, and is configured to accommodate the LED element 201 and a light guide 203 therein. As shown in FIG. 8 and the like, in order to convert the divergent light from each LED element 201 into a substantially parallel light flux, the end surface of the light guide 203 is provided with a lens shape in which the cross-sectional area gradually increases toward the opposite surface with respect to the light receiving portion and which has a function of gradually reducing the divergence angle when making total reflection plural times during the propagation therein. The liquid crystal display panel 11 constituting the video display apparatus 1 is attached to the upper surface of the light guide 203. Further, the LED element 201 which is a semiconductor light source and an LED substrate 202 on which a control circuit of the LED element 201 is mounted are attached to one side surface (an end surface on the left side of FIG. 8 in this example) of the case of the light source apparatus 13. In addition, a heat sink which is a member for cooling heat generated in the LED element 201 and the control circuit may be attached to an outer surface of the LED substrate 202.

Also, to a frame (not shown) of the liquid crystal display panel 11 attached to the upper surface of the case of the light source apparatus 13, the liquid crystal display panel 11 attached to the frame, an FPC (Flexible Printed Circuits) board (not shown) electrically connected to the liquid crystal display panel 11, and the like are attached. Namely, the liquid crystal display panel 11 which is a liquid crystal display element generates a display video by modulating the intensity of transmitted light based on a control signal from a control circuit (not shown) constituting an electronic device together with the LED element 201 which is a solid-state light source. At this time, since the generated video light has a narrow diffusion angle and only a specific polarized component, it is possible to obtain the novel and unconventional video display apparatus 1 which is close to a surface-emitting laser video source driven by a video signal. Note that, at present, a laser light flux having the same size as the image obtained by the above-described video display apparatus 1 cannot be obtained by using a laser apparatus for both technical and safety reasons. Therefore, in the present embodiment, for example, light close to the above-described surface-emitting laser video light is obtained from a light flux from a general light source including the LED element 201.

Subsequently, the configuration of the optical system accommodated in the case of the light source apparatus 13 will be described in detail with reference to FIG. 8 and FIG. 9. Since FIG. 8 and FIG. 9 are cross-sectional views, only one of a plurality of LED elements 201 constituting the light source is shown. The light from these LED elements 201 is converted into substantially collimated light (substantially parallel light) by the shape of a light-receiving end surface 203a of the light guide 203. Therefore, the light receiving portion on the end surface of the light guide and the LED element 201 are attached while maintaining a predetermined positional relationship. Note that each of the light guides 203 is formed of, for example, a translucent resin such as acrylic. Also, though not shown, the LED light-receiving surface at the end of the light guide has, for example, a conical convex outer peripheral surface obtained by rotating a parabolic cross section, the top thereof has a concave portion having a convex portion (i.e., a convex lens surface) formed at its central portion, and the central portion of the flat surface portion thereof has a convex lens surface protruding outward (or may be a concave lens surface recessed inward). Note that the external shape of the light receiving portion of the light guide 203 to which the LED element 201 is attached is a paraboloid shape that forms a conical outer peripheral surface, and is set within a range of an angle at which light emitted from the LED element in the peripheral direction can be totally reflected inside the paraboloid, or has a reflection surface formed thereon.

On the other hand, each of the LED elements 201 is arranged at a predetermined position on the surface of the LED substrate 202 which is a circuit board for the LED elements 201. The LED substrate 202 is arranged and fixed to the LED collimator (the light-receiving end surface 203a of the light guide 203) such that each of the LED elements 201 on the surface thereof is located at the central portion of the concave portion described above.

With such a configuration, the light emitted from the LED elements 201 can be extracted as substantially parallel light due to the shape of the light-receiving end surface 203a of the light guide 203, and the utilization efficiency of the generated light can be improved.

As described above, the light source apparatus 13 is configured by attaching a light source unit, in which a plurality of LED elements 201 as light sources are arranged, to the light-receiving end surface 203a which is a light receiving portion provided on the end surface of the light guide 203. In the light source apparatus 13, the divergent light flux from the LED elements 201 is converted into substantially parallel light by the lens shape of the light-receiving end surface 203a on the end surface of the light guide 203, is guided through the inside of the light guide 203 (in the direction parallel to the drawing) as indicated by arrows, and is emitted toward the liquid crystal display panel 11 arranged substantially parallel to the light guide 203 by a light flux direction converter 204. The uniformity of the light flux that enters the liquid crystal display panel 11 can be controlled by optimizing the distribution (density) of the light flux direction converter 204 by the shape inside the light guide 203 or the shape of the surface of the light guide 203.

By providing, for example, a portion having a different refractive index in the shape of the surface of the light guide 203 or inside the light guide 203, the above-described light flux direction converter 204 emits the light flux propagating through the inside of the light guide 203 toward the liquid crystal display panel 11 arranged substantially in parallel to the light guide 203. At this time, if the relative luminance ratio when comparing the luminance at the center of the screen with the luminance of the peripheral portion of the screen in a state in which the liquid crystal display panel 11 squarely faces the center of the screen and the viewpoint is placed at the same position as the diagonal dimension of the screen is 20% or more, there is no problem in practical use, and if the relative luminance ratio exceeds 30%, the characteristics will be even better.

Note that FIG. 8 and FIG. 9 are cross-sectional layout drawings for describing the configuration and action of the light source (light source apparatus 13) of the present embodiment that performs polarization conversion in the light source apparatus 13 including the light guide 203 and the LED element 201 described above. FIG. 8 shows the case of conversion from the P-polarized light to the S-polarized light, and FIG. 9 shows the case of the conversion from the S-polarized light to the P-polarized light. In FIG. 8 and FIG. 9, the light source apparatus 13 is composed of, for example, the light guide 203 which is formed of plastic or the like and is provided with the light flux direction converter 204 on its surface or inside, the LED element 201 as a light source, a reflection sheet 205, a retardation plate 206, and a lenticular lens, and the liquid crystal display panel 11 including polarizing plates on its light source light incident surface and video light emission surface is attached to the upper surface of the light source apparatus 13 (light guide 203).

In FIG. 8, a film-shaped or sheet-shaped reflective polarizing plate 49 is provided on the light source light incident surface (lower surface) of the liquid crystal display panel 11 facing the light source apparatus 13, whereby one polarized wave (e.g., a P-wave) 212 of the natural light flux 210 emitted from the LED element 201 is selectively reflected, and the reflected light is reflected by the reflection sheet 205 provided on one surface (lower side) of the light guide 203 and is directed toward the liquid crystal display panel 11 again. A λ/4 plate which is a retardation plate 216 is provided between the reflection sheet 205 and the light guide 203 or between the light guide 203 and the reflective polarizing plate 49, and the light is reflected by the reflection sheet 205 to pass through the retardation plate twice, so that the reflected light flux is converted from the P-polarized light to the S-polarized light and the utilization efficiency of the light source light as video light can be improved. The video light flux whose light intensity is modulated by the video signal in the liquid crystal display panel 11 as indicated by the arrows 213 in FIG. 8 enters the retroreflector 2 in FIG. 1 and is reflected and then transmitted through the window glass 105, so that the air floating video 3 which is a real image can be obtained inside or outside the space of the store.

In FIG. 9, the film-shaped or sheet-shaped reflective polarizing plate 49 is provided on the light source light incident surface (lower surface) of the liquid crystal display panel 11 facing the light source apparatus 13, whereby one polarized wave (e.g., a S-wave) 211 of the natural light flux 210 emitted from the LED light source 201 is selectively reflected. Then, the reflected light is reflected by the reflection sheet 205 provided on one surface (lower side) of the light guide 203 and is directed toward the liquid crystal display panel 11 again. Further, a λ/4 plate which is the retardation plate 216 is provided between the reflection sheet 205 and the light guide 203 or between the light guide 203 and the reflective polarizing plate 49, and the light is reflected by the reflection sheet 205 to pass through the retardation plate twice, so that the reflected light flux is converted from the S-polarized light to the P-polarized light and the utilization efficiency of the light source light as video light can be improved. The video light flux whose light intensity is modulated by the video signal in the liquid crystal display panel 11 as indicated by the arrows 214 in FIG. 9 enters the retroreflector 2 in FIG. 1 and is reflected and then transmitted through the window glass 105, so that the air floating video 3 which is a real image can be obtained inside or outside the space of the store.

In the light source apparatuses shown in FIG. 8 and FIG. 9, in addition to the action of the reflective polarizing plate 49 provided on the light incident surface of the facing liquid crystal display panel 11, the polarization component on one side is reflected by the reflective polarizing plate, and thus the contrast ratio theoretically obtained is the product of the reciprocal of the cross transmittance of the reflective polarizing plate 49 and the reciprocal of the cross transmittance obtained by the two polarizing plates attached to the liquid crystal display panel 11. Therefore, high contrast performance can be obtained. In practice, it has been experimentally confirmed that the contrast performance of the display image is improved by 10 times or more. As a result, a high-quality video comparable to that of a self-luminous organic EL can be obtained.

<Example of Video Display Apparatus (2)>

Figure 10:
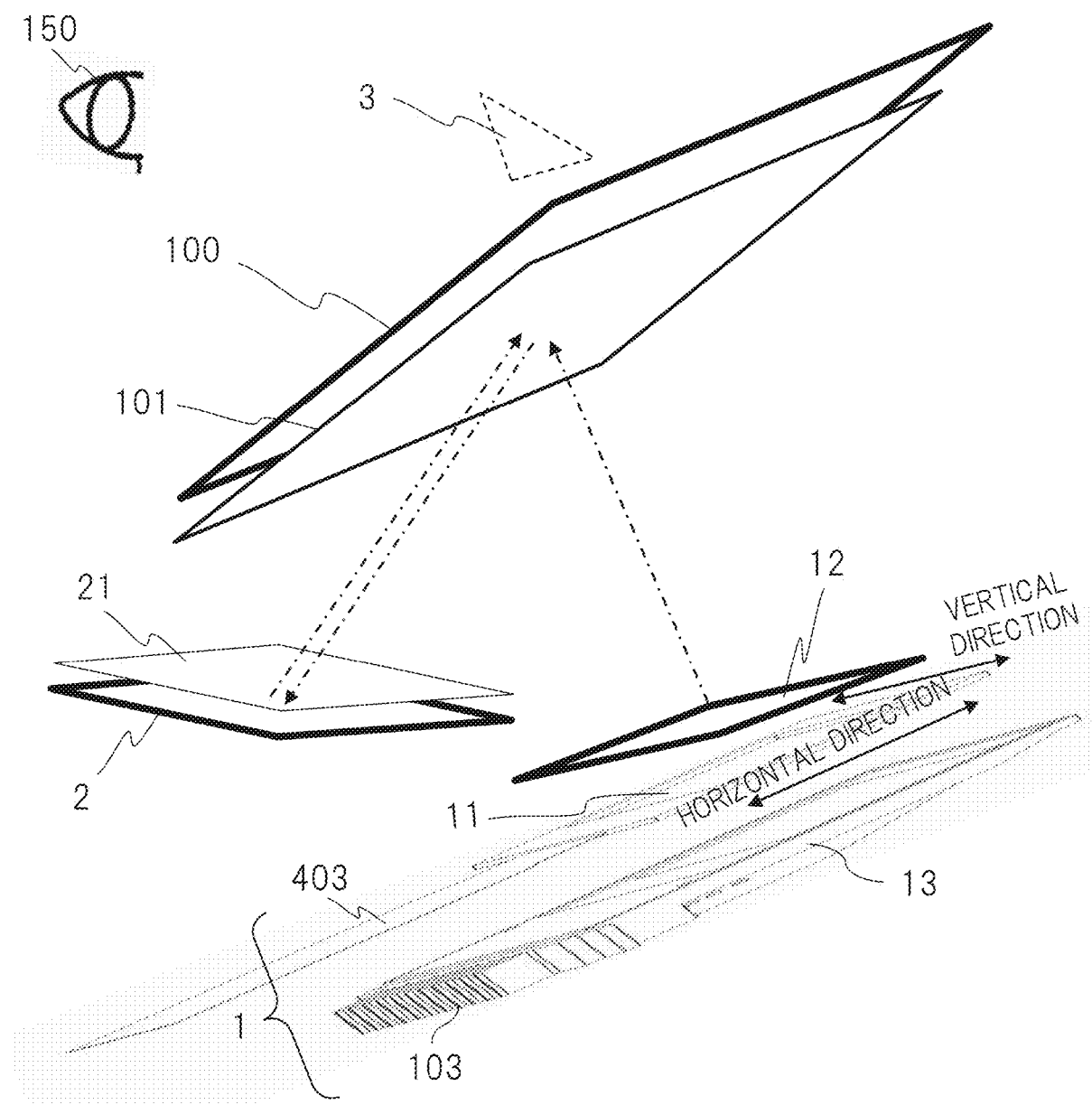
FIG. 10 is a layout drawing showing a main part of the air floating video display apparatus according to one embodiment of the present invention.

FIG. 10 shows another example of a specific configuration of the video display apparatus 1. The light source apparatus 13 in FIG. 10 has the same configuration as that of the light source apparatus in FIG. 12 and the like described later. The light source apparatus 13 is composed of an LED, a collimator, a synthetic diffusion block, a light guide, and the like accommodated in a case made of, for example, plastic, and the liquid crystal display panel 11 is attached to the upper surface thereof. Further, LED elements 14 which are semiconductor light sources shown in FIG. 12, FIG. 13, and others and an LED substrate 102 on which a control circuit thereof is mounted are attached to one side surface of the case of the light source apparatus 13, and a heat sink 103 which is a member for cooling the heat generated in the LED elements 14 and the control circuit is attached to an outer surface of the LED substrate 102.

Also, to a frame of the liquid crystal display panel attached to the upper surface of the case, the liquid crystal display panel 11 attached to the frame of the liquid crystal display panel, an FPC board 403 electrically connected to the liquid crystal display panel 11, and the like are attached. Namely, the liquid crystal display panel 11 which is a liquid crystal display element generates a display video by modulating the intensity of transmitted light based on a control signal from a control circuit (not shown here) constituting an electronic device together with the LED elements 14 which are solid-state light sources.

<Example of Video Display Apparatus (3)>

Figure 11:
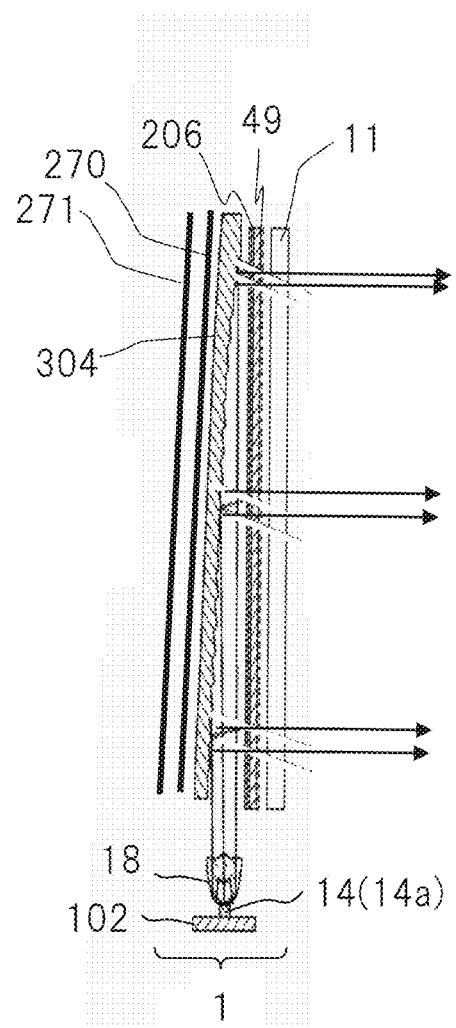
FIG. 11 is a cross-sectional view showing a configuration of a video display apparatus constituting the air floating video display apparatus according to one embodiment of the present invention.

Subsequently, another example of a specific configuration of the video display apparatus 1 will be described with reference to FIG. 11. The light source apparatus of the video display apparatus 1 converts a divergent light flux of natural light, in which a P-polarized wave and an S-polarized wave are mixed, from the LED element 14 (for example, LED element 14a) into a substantially parallel light flux by an LED collimator lens 18, and reflects the light flux toward the liquid crystal display panel 11 by a reflective light guide 304. The reflected light enters the wavelength plate and the reflective polarizing plate 49 arranged between the liquid crystal display panel 11 and the reflective light guide 304. A specific polarized wave (e.g., an S-polarized wave) is reflected by the reflective polarizing plate 49 and returns to the reflection surface with its phase converted by the wavelength plate, and passes through the retardation plate 216 again to be converted into a polarized wave (e.g., a P-polarized wave) that transmits through the reflective polarizing plate 49.

As a result, the natural light from the LED element 14 is aligned into a specific polarized wave (e.g., P-polarized wave) and enters the liquid crystal display panel 11, and the luminance is modulated in accordance with a video signal to display a video on the panel surface. As in the above-described example, a plurality of LED elements 14 constituting the light source are provided (only one LED element 14a is shown as an example in FIG. 11 due to the vertical cross section), and these LED elements are attached at predetermined positions with respect to the LED collimator lenses 18. Note that each of the LED collimator lenses 18 is formed of, for example, a translucent resin such as acrylic or glass. Further, the LED collimator lens 18 has a conical convex outer peripheral surface obtained by rotating a parabolic cross section, and the top thereof has a concave portion in which a convex portion (i.e., a convex lens surface) is formed at its central portion as in the example described above. Also, the central portion of the flat surface portion thereof has a convex lens surface protruding outward (or may be a concave lens surface recessed inward). Note that the paraboloid that forms the conical outer peripheral surface of the LED collimator lens 18 is set within a range of an angle at which light emitted from the LED element 14 in the peripheral direction can be totally reflected inside the paraboloid, or has a reflection surface formed thereon.

Figure 12:
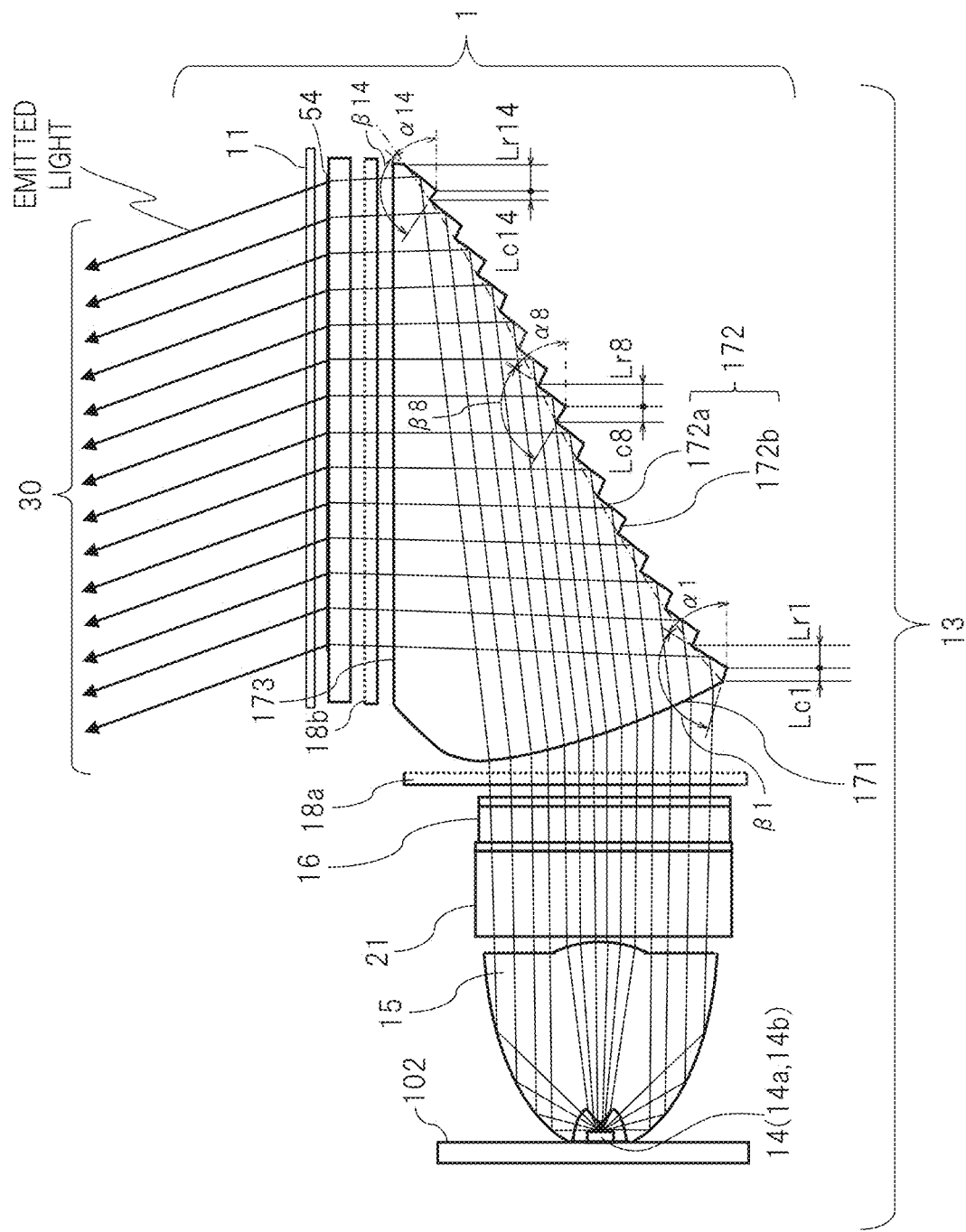
FIG. 12 is a cross-sectional view showing an example of a specific configuration of the light source apparatus.
Figure 13:
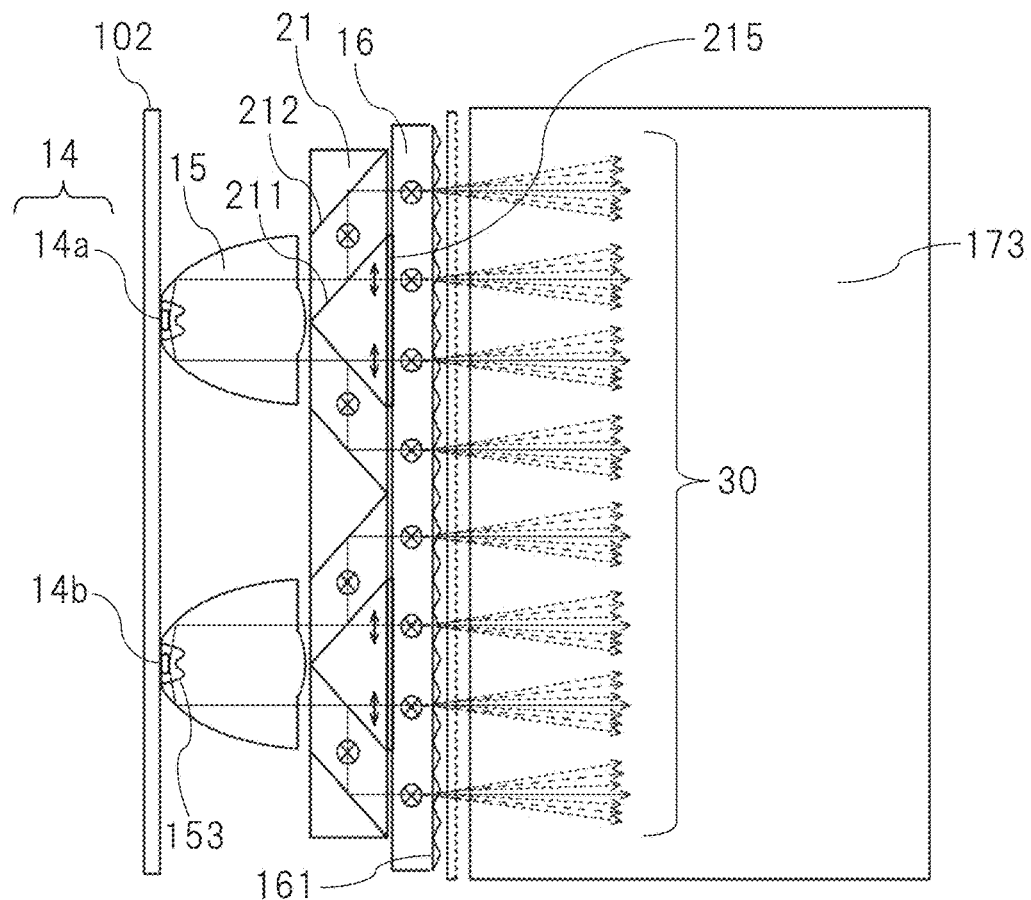
FIG. 13 is a cross-sectional view showing an example of a specific configuration of the light source apparatus.
Figure 13:
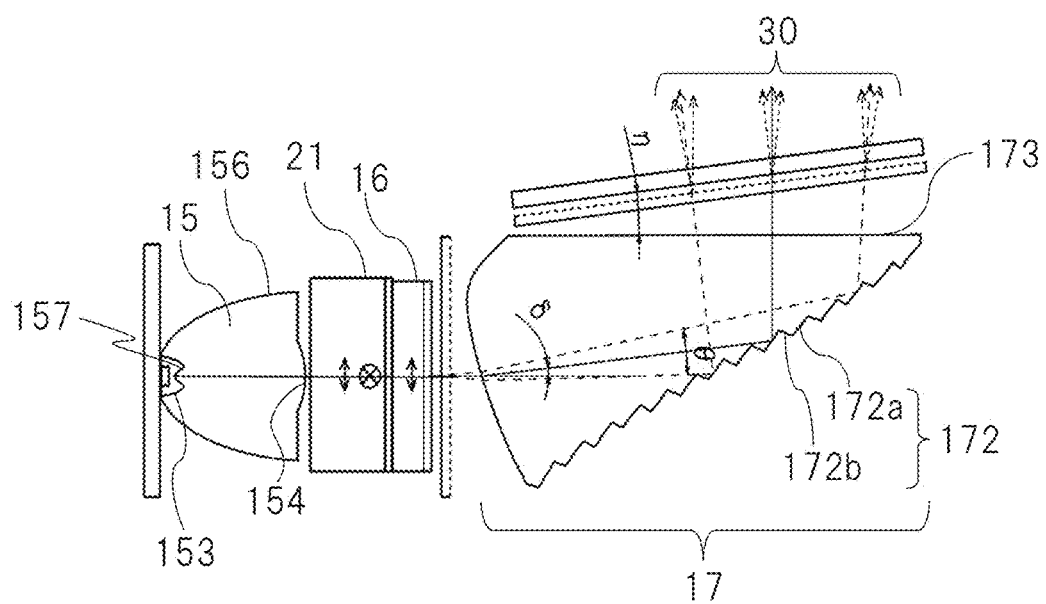

The above-described configuration is the same as that of the light source apparatus of the video display apparatus shown in FIG. 12, FIG. 13, and the like. Further, the light converted into substantially parallel light by the LED collimator lens 18 shown in FIG. 11 is reflected by the reflective light guide 304, light of a specific polarized wave is transmitted by the action of the reflective polarizing plate 49, and the reflected light of the other polarized wave is transmitted through the reflective light guide 304 again and reflected by a reflection plate 271 provided to face the surface of the reflective light guide 304 on the side opposite to the liquid crystal display panel 11. At this time, the light passes through a λ/4 plate which is a retardation plate 270 arranged between the reflection plate 271 and the reflective light guide 304 twice to be subjected to polarization conversion, is transmitted through the light guide 304 again, is transmitted through the reflective polarizing plate 49 provided on the opposite side, that is, on the side of the liquid crystal panel 11, and is made to enter the liquid crystal display panel 11 with the aligned polarization direction. As a result, all the light of the light source can be used, and thus the utilization efficiency of light is doubled.

Figure 16:
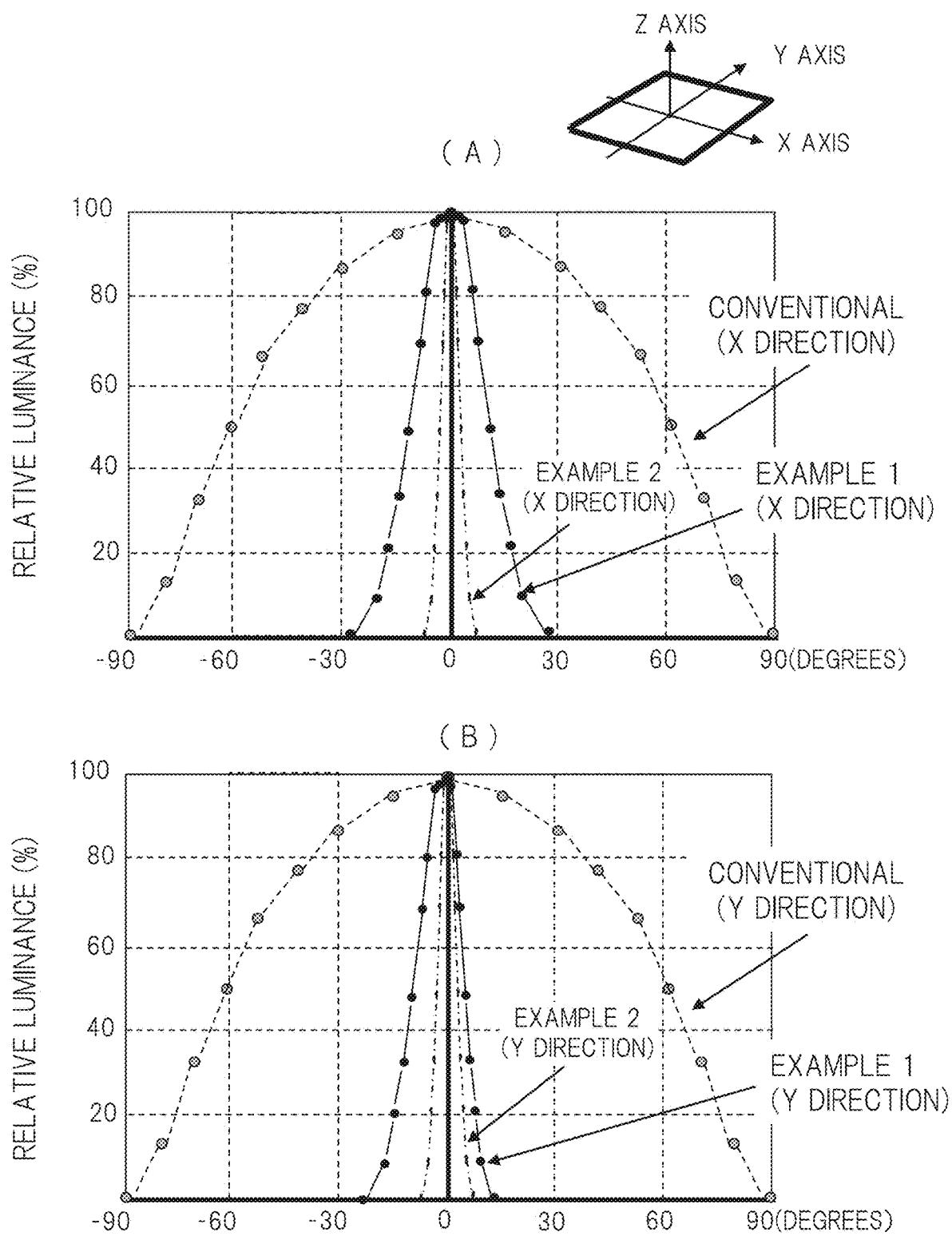
FIG. 16 is an explanatory diagram for describing diffusion characteristics of the video display apparatus.

In a conventional TV set, light emitted from the liquid crystal display panel 11 has similar diffusion characteristics in both the horizontal direction of the screen (indicated by the X axis in FIG. 16(A)) and the vertical direction of the screen (indicated by the Y axis in FIG. 16 (B)). On the other hand, in the diffusion characteristics of the light flux emitted from the liquid crystal display panel 11 of the present embodiment, for example, as shown in Example 1 in FIG. 16, the viewing angle at which the luminance becomes 50% of that in front view (angle of 0 degrees) is 13 degrees, and this is ⅕ of the conventional viewing angle of 62 degrees. Similarly, the reflection angle of the reflective light guide, the area of the reflection surface, and the like are optimized such that the viewing angle in the vertical direction is made uneven in top and bottom and the viewing angle on the upper side is suppressed to about ⅓ of the viewing angle on the lower side. As a result, the amount of video light toward the viewing direction is significantly improved as compared with the conventional liquid crystal TV, and the luminance is 50 times or more.

Further, in the viewing angle characteristics shown in Example 2 in FIG. 16, the viewing angle at which the luminance becomes 50% of that in front view (angle of 0 degrees) is 5 degrees, and this is ¹⁄₁₂ of the conventional viewing angle of 62 degrees. Similarly, the reflection angle of the reflective light guide, the area of the reflection surface, and the like are optimized such that the viewing angle in the vertical direction is made even in top and bottom and the viewing angle is suppressed to about ¹⁄₁₂ of the conventional viewing angle. As a result, the amount of video light toward the viewing direction is significantly improved as compared with the conventional liquid crystal TV, and the luminance is 100 times or more. As described above, by setting the viewing angle to a narrow angle, the amount of light flux toward the viewing direction can be concentrated, so that the utilization efficiency of light is significantly improved. As a result, even if a conventional liquid crystal display panel for TV is used, it is possible to realize a significant improvement in luminance with the same power consumption by controlling the light diffusion characteristics of the light source apparatus, and to provide the video display apparatus 1 suitable for the air floating video display apparatus for bright outdoor use.

Referring to FIG. 11 again, as a basic configuration, as shown in FIG. 11, a light flux having narrow-angle directional characteristics is made to enter the liquid crystal display panel 11 by the light source apparatus, and the luminance is modulated in accordance with a video signal, whereby the air floating video 3 obtained by reflecting the video information displayed on the screen of the liquid crystal display panel 11 by the retroreflector 2 is displayed outdoors or indoors through the window glass 105 in FIG. 1.

<Example of Light Source Apparatus 13 (1)>

Subsequently, a configuration example of the optical system of the light source apparatus 13 or the like accommodated in the housing 106 in FIG. 6B will be described in detail with reference to FIG. 12, FIG. 13(A), and FIG. 13(B).

FIG. 12 shows the LED elements 14 (14a, 14b) constituting the light source, and these LED elements are attached at predetermined positions with respect to LED collimators 15. Note that each of the LED collimators 15 is formed of, for example, a translucent resin such as acrylic. Further, as shown also in FIG. 13(B), the LED collimator 15 has a conical convex outer peripheral surface 156 obtained by rotating a parabolic cross section, and the top thereof has a concave portion 153 in which a convex portion (i.e., a convex lens surface) 157 is formed at its central portion. Also, the central portion of the flat surface portion thereof has a convex lens surface 154 protruding outward (or may be a concave lens surface recessed inward). Note that the paraboloid that forms the conical outer peripheral surface 156 of the LED collimator 15 is set within a range of an angle at which light emitted from the LED elements 14 in the peripheral direction can be totally reflected inside the paraboloid, or has a reflection surface formed thereon.

Also, each of the LED elements 14 is arranged at a predetermined position on the surface of the LED substrate 102 which is a circuit board for the LED elements. The LED substrate 102 is arranged and fixed to the LED collimator 15 such that each of the LED elements 14 (14a, 14b) on the surface thereof is located at the central portion of the concave portion 153 of the LED collimator 15.

With such a configuration, of the light emitted from the LED element 14, in particular, the light emitted upward (to the right in FIG. 13(B)) from the central portion thereof is condensed into parallel light by the two convex lens surfaces 157 and 154 forming the outer shape of the LED collimator 15. Also, the light emitted from the other portion toward the peripheral direction is reflected by the paraboloid forming the conical outer peripheral surface 156 of the LED collimator 15, and is similarly condensed into parallel light. In other words, with the LED collimator 15 having a convex lens formed at the central portion thereof and a paraboloid formed in the peripheral portion thereof, it is possible to extract substantially all of the light generated by the LED elements 14 (14a, 14b) as parallel light, and to improve the utilization efficiency of the generated light.

Note that a polarization conversion element 21 is provided on the light emission side of the LED collimator 15. As is apparent also from FIG. 13, the polarization conversion element 21 is configured by combining a columnar translucent member having a parallelogram cross section (hereinafter referred to as a parallelogram column) and a columnar translucent member having a triangular cross section (hereinafter referred to as a triangular column), and arranging a plurality of the combinations of the members in an array in parallel to a plane orthogonal to the optical axis of the parallel light from the LED collimator 15. Further, polarizing beam splitters (hereinafter referred to as "PBS films") 211 and reflective films 212 are alternately provided at the interface between the adjacent translucent members arranged in an array, and a λ/2 phase plate 215 is provided on the emission surface from which light that has entered the polarization conversion element 21 and has been transmitted through the PBS films 211 is emitted.

A rectangular synthetic diffusion block 16 shown also in FIG. 13(A) is further provided on the emission surface of the polarization conversion element 21. Namely, the light emitted from the LED element 14 becomes parallel light by the action of the LED collimator 15 to enter the synthetic diffusion block 16, and reaches the light guide 17 after being diffused by textures 161 on the emission side.

The light guide 17 is a member made of, for example, a translucent resin such as acrylic and formed in a rod shape having a substantially triangular cross section as shown in FIG. 13(B). Further, as is apparent also from FIG. 12, the light guide 17 includes a light guide light incident portion (including light guide light incident surface) 171 configured to face the emission surface of the synthetic diffusion block 16 with a first diffusion plate 18a interposed therebetween, a light guide light reflection portion (including light guide light reflection surface) 172 configured to form an inclined surface, and a light guide light emission portion (including light guide light emission surface) 173 configured to face the liquid crystal display panel 11, which is a liquid crystal display element, with a second diffusion plate 18b interposed therebetween.

On the light guide light reflection portion 172 of the light guide 17, as shown also in FIG. 12 and FIG. 13(B) which is a partially enlarged view, a large number of reflection surfaces 172a and connection surfaces 172b are alternately formed in a saw-tooth shape. Also, the reflection surface 172a (a line segment rising to the right in FIG. 13(B)) forms an (n is a natural number and is 1 to 130 in this example) with respect to the horizontal plane indicated by the dashedand-dotted line in the drawing, and an is here set to 43 degrees or less (however, 0 degrees or more) as an example.

The light guide light incident portion 171 is formed in a curved convex shape inclined toward the light source side. According to this, as is apparent also from FIG. 12, after the parallel light from the emission surface of the synthetic diffusion block 16 enters while being diffused through the first diffusion plate 18a, the light reaches the light guide light reflection portion 172 while being slightly bent (deflected) upward by the light guide light incident portion 171, and is reflected here to reach the liquid crystal display panel 11 provided on the emission surface on the upper side in FIG. 12.

With the video display apparatus 1 described above in detail, it is possible to further improve the light utilization efficiency and its uniform illumination characteristics, and it is also possible to manufacture the video display apparatus 1 including a modularized light source apparatus for S-polarized wave in a small size and at a low cost. Note that, in the above description, the polarization conversion element 21 is attached behind the LED collimator 15, but the present invention is not limited thereto, and the same function and effect can be obtained even by providing the polarization conversion element 21 in the optical path leading to the liquid crystal display panel 11.

Note that a large number of reflection surfaces 172a and connection surfaces 172b are alternately formed in a sawtooth shape on the light guide light reflection portion 172, and the illumination light flux is totally reflected on each reflection surface 172a and directed upward. Further, since a narrow-angle diffusion plate (not shown) is provided on the light guide light emission portion 173, the illumination light flux enters the light direction conversion panel 54 for controlling the directional characteristics as a substantially parallel diffused light flux, and then enters the liquid crystal display panel 11 from the oblique direction. In the present embodiment, the light direction conversion panel 54 is provided between the light guide light emission portion 173 and the liquid crystal display panel 11, but the same effect can be obtained even if the light direction conversion panel 54 is provided on the emission surface of the liquid crystal display panel 11.

<Example of Light Source Apparatus 13 (2)>

Figure 14:
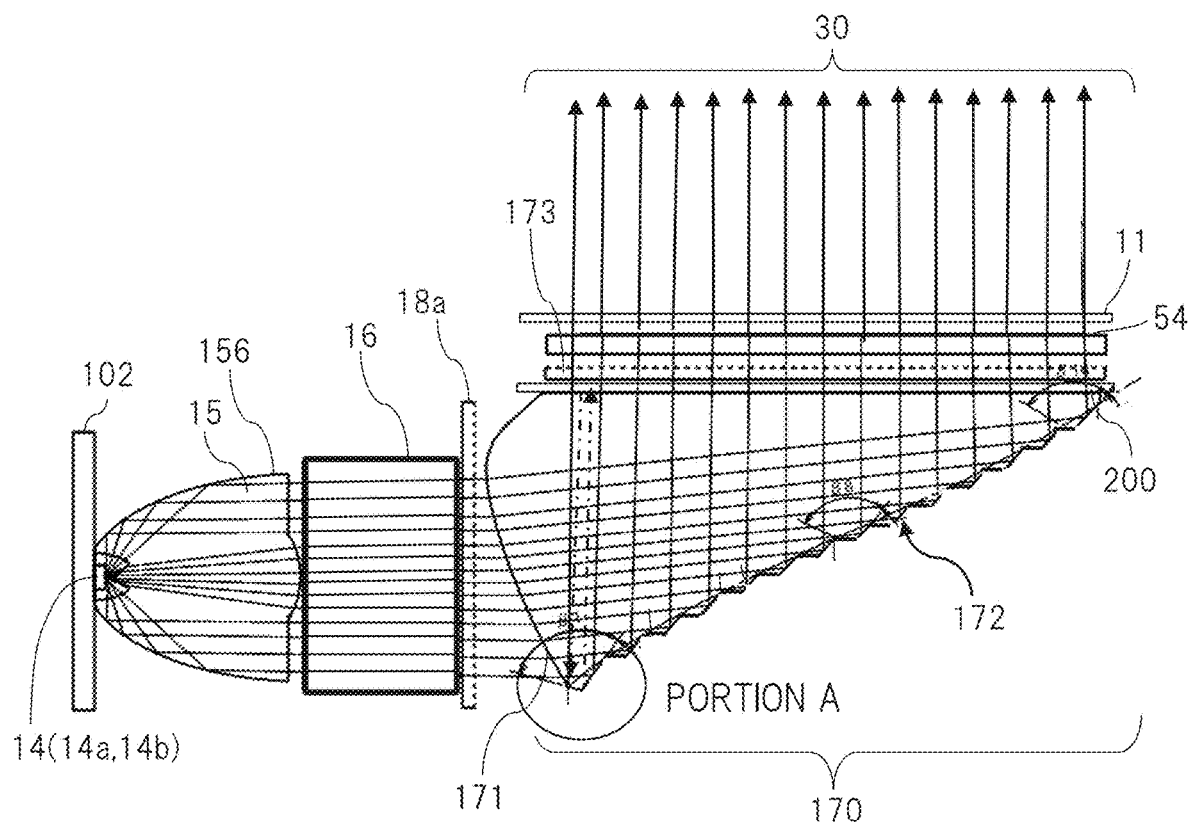
FIG. 14 is a cross-sectional view showing an example of a specific configuration of the light source apparatus.
Figure 14:
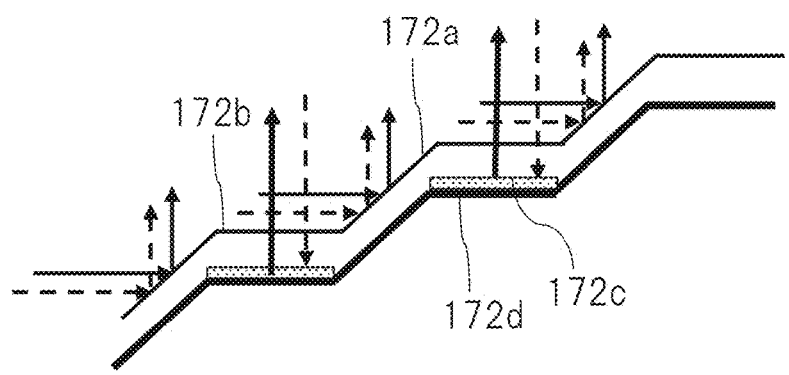

FIG. 14 shows another example of the configuration of the optical system of the light source apparatus 13 or the like. As in the example shown in FIG. 13, a plurality of (two in this example) LED elements 14 (14a, 14b) constituting the light source are shown, and these LED elements are attached at predetermined positions with respect to the LED collimators 15 in FIG. 14. Note that each of the LED collimators 15 is formed of, for example, a translucent resin such as acrylic. Further, as in the example shown in FIG. 13, the LED collimator 15 has a conical convex outer peripheral surface 156 obtained by rotating a parabolic cross section, and the top thereof has a concave portion 153 in which a convex portion (i.e., a convex lens surface) 157 is formed at its central portion. Also, the central portion of the flat surface portion thereof has a convex lens surface 154 protruding outward (or may be a concave lens surface recessed inward). Note that the paraboloid that forms the conical outer peripheral surface 156 of the LED collimator 15 is set within a range of an angle at which light emitted from the LED element 14 in the peripheral direction can be totally reflected inside the paraboloid, or has a reflection surface formed thereon.

Also, each of the LED elements 14 (14a, 14b) is arranged at a predetermined position on the surface of the LED substrate 102 which is a circuit board for the LED elements. The LED substrate 102 is arranged and fixed to the LED collimator 15 such that each of the LED elements 14 (14a, 14b) on the surface thereof is located at the central portion of the concave portion 153 of the LED collimator 15.

With such a configuration, of the light emitted from the LED element 14, in particular, the light emitted upward (to the right in FIG. 14) from the central portion thereof is condensed into parallel light by the two convex lens surfaces 157 and 154 forming the outer shape of the LED collimator 15. Also, the light emitted from the other portion toward the peripheral direction is reflected by the paraboloid forming the conical outer peripheral surface 156 of the LED collimator 15, and is similarly condensed into parallel light. In other words, with the LED collimator 15 having a convex lens formed at the central portion thereof and a paraboloid formed in the peripheral portion thereof, it is possible to extract substantially all of the light generated by the LED element 14 as parallel light, and to improve the utilization efficiency of the generated light.

Note that a light guide 170 is provided on the light emission side of the LED collimator 15 with the first diffusion plate 18a interposed therebetween as shown in FIG. 14(A). The light guide 170 is a member made of, for example, a translucent resin such as acrylic and formed in a rod shape having a substantially triangular cross section. Further, as is apparent also from FIG. 14(A), the light guide 170 includes the light guide light incident portion (including light guide light incident surface) 171 of the light guide 170 configured to face the emission surface of the synthetic diffusion block 16 with the first diffusion plate 18a interposed therebetween, the light guide light reflection portion (including light guide light reflection surface) 172 configured to form an inclined surface, and the light guide light emission portion (including light guide light emission surface) 173 configured to face the liquid crystal display panel 11, which is a liquid crystal display element, with a reflective polarizing plate 200 interposed therebetween.

For example, if the reflective polarizing plate 200 having the characteristics of reflecting the P-polarized light and transmitting the S-polarized light is selected, the P-polarized light of the natural light emitted from the LED element 14 as a light source is reflected, the reflected light passes through a $\lambda/4$ plate 172c provided on the light guide light reflection portion 172 shown in FIG. 14(B) and is reflected again by a reflection surface 172d, and is converted into the S-polarized light by passing through the $\lambda/4$ plate 172 again, so that all the light fluxes entering the liquid crystal display panel 11 are unified into the S-polarized light.

Similarly, if the reflective polarizing plate 200 having the characteristics of reflecting the S-polarized light and transmitting the P-polarized light is selected, the S-polarized light of the natural light emitted from the LED element 14 as a light source is reflected, the reflected light passes through the $\lambda/4$ plate 172c provided on the light guide light reflection portion 172 shown in FIG. 14(B) and is reflected again by the reflection surface 172d, and is converted into the P-polarized light by passing through the $\lambda/4$ plate 172 again, so that all the light fluxes entering the liquid crystal display panel 11 are unified into the P-polarized light. The polarization conversion can be realized also by the configuration described above.

<Example of Light Source Apparatus 13 (3)>

Another example of the configuration of the optical system of the light source apparatus or the like will be described with reference to FIG. 11. In the third example, as shown in FIG. 11, a divergent light flux of natural light, in which P-polarized light and S-polarized light are mixed, from the LED substrate 102 is converted into a substantially parallel light flux by the LED collimator lens 18, and is reflected toward the liquid crystal display panel 11 by the reflective light guide 304. The reflected light enters a reflective polarizing plate 206 arranged between the liquid crystal display panel 11 and the reflective light guide 304. A specific polarized wave (e.g., an S-polarized wave) is reflected by the reflective polarizing plate 206, passes through a surface connecting the reflection surfaces of the light guide 304, is subjected to polarization conversion by passing through the phase plate (λ/4 wavelength plate) 270 twice by being reflected by the reflection plate 271 arranged to face the opposite surface of the light guide 304, passes through the light guide and the reflective polarizing plate, and then enters the liquid crystal display panel 11 to be modulated into video light. At this time, by matching the specific polarized wave and the polarization plane subjected to polarization conversion, the utilization efficiency of light becomes twice as high as usual, and the degree of polarization (extinction ratio) of the reflective polarizing plate is also multiplied with the extinction ratio of the entire system, so that the contrast ratio of the information display system is significantly improved by using the light source apparatus of the present embodiment.

As a result, the natural light from the LED is aligned into a specific polarized wave (e.g., a P-polarized wave). In FIG. 11, as in the above-described example, a plurality of LED elements 14 constituting the light source are provided (only one LED element is shown due to the vertical cross section), and these LED elements are attached at predetermined positions with respect to the LED collimator lenses 18. Note that each of the LED collimator lenses 18 is formed of, for example, a translucent resin such as acrylic or glass. Further, as in the example described above, the LED collimator 18 has a conical convex outer peripheral surface obtained by rotating a parabolic cross section, and the top thereof has a concave portion in which a convex portion (i.e., a convex lens surface) is formed at its central portion. Also, the central portion of the flat surface portion thereof has a convex lens surface protruding outward (or may be a concave lens surface recessed inward). Note that the paraboloid that forms the conical outer peripheral surface of the LED collimator lens 18 is set within a range of an angle at which light emitted from the LED collimator lens 18 in the peripheral direction can be totally reflected inside the paraboloid, or has a reflection surface formed thereon.

Also, each of the LED elements 14 is arranged at a predetermined position on the surface of the LED substrate 102 which is a circuit board for the LED elements. The LED substrate 102 is arranged and fixed to the LED collimator lens 18 such that each of the LEDs on the surface thereof is located at the central portion of the concave portion of the LED collimator lens 18.

With such a configuration, of the light emitted from the LED element 14, in particular, the light emitted from the central portion thereof is condensed into parallel light by the two convex lens surfaces forming the outer shape of the LED collimator lens 18. Also, the light emitted from the other portion toward the peripheral direction is reflected by the paraboloid forming the conical outer peripheral surface of the LED collimator lens 18, and is similarly condensed into parallel light. In other words, with the LED collimator lens 18 having a convex lens formed at the central portion thereof and a paraboloid formed in the peripheral portion thereof, it is possible to extract substantially all of the light generated by the LED element 14 as parallel light, and to improve the utilization efficiency of the generated light.

<Example of Light Source Apparatus 13 (4)>

Figure 17:
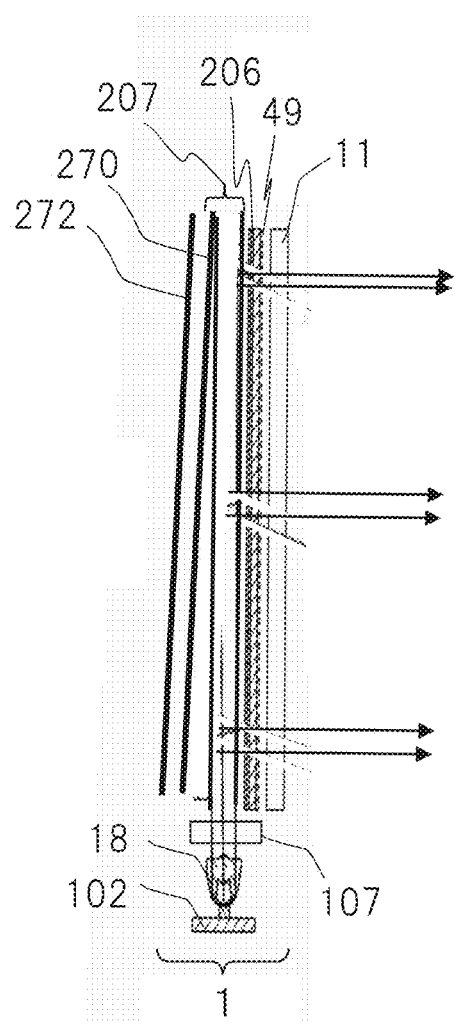
FIG. 17 is a cross-sectional view showing the configuration of the video display apparatus constituting the air floating video display apparatus according to one embodiment of the present invention.

Further, another example of the configuration of the optical system of the light source apparatus or the like will be described with reference to FIG. 17. Two optical sheets 207 for converting the diffusion characteristics in the vertical direction and the horizontal direction of the drawing are provided on the light emission side of the LED collimator lens 18, and the light from the LED collimator lens 18 is made to enter between the two optical sheets 207 (referred to also as diffusion sheets or diffusion films). When the optical sheet 207 is composed of one sheet, the vertical and horizontal diffusion characteristics are controlled by the fine shapes of the front surface and the back surface. Alternatively, a plurality of diffusion sheets may be used to share the function. By the front surface shape and the back surface shape of the optical sheet 207, the diffusion angle of the light from the LED collimator lens 18 in the vertical direction of the screen is matched to the width of the vertical surface of the reflection surface of the optical sheet 207, and the optimal design is preferably made in the horizontal direction with using the number of LED elements 14 and the divergence angle from the optical element 107 as design parameters such that the surface density of the light flux emitted from the liquid crystal display panel 11 is uniform. In other words, in the present embodiment, the diffusion characteristics are controlled by the surface shapes of the plurality of diffusion sheets instead of the light guide. In the present embodiment, the polarization conversion is performed in the same manner as in the example of the light source apparatus (3) described above. Moreover, by providing the polarization conversion element between the LED collimator lens 18 and the optical sheet 207, the light source light may be made to enter the optical sheet 207 after performing the polarization conversion.

If the above-described reflective polarizing plate 206 having the characteristics of reflecting the S-polarized light and transmitting the P-polarized light is selected, the S-polarized light of the natural light emitted from the LED element as a light source is reflected, passes through the retardation plate 270, is reflected by the reflection surface 272, is converted into the P-polarized light by passing through the retardation plate 270 again, and then enters the liquid crystal display panel 11. It is necessary to select the optimum value for the thickness of the retardation plate 270 in accordance with the incident angle of the light beam on the retardation plate, and the optimum value is present in the range from λ/16 to λ/4.

<Example of Light Source Apparatus (5)>

Another example of the configuration of the optical system of the light source apparatus 13 will be described with reference to FIG. 18. As shown in FIG. 18(C), the polarization conversion element 21 is arranged on the light emission side of the LED collimator lens 18. Then, the natural light from the LED element 14 (for example, the LED element 14c) is aligned into a specific polarized wave and enters an optical element 81 for controlling diffusion characteristics, and the light distribution characteristics toward the reflection surface of the reflective light guide 220 are optimized by controlling the diffusion characteristics in the vertical and horizontal directions of the drawing. As shown in FIG. 18(B), the surface of the reflective light guide 220 is provided with a concave-convex pattern 222, and the desired diffusion characteristics are obtained by reflecting light toward the video display apparatus (not shown) arranged on the opposite surface of the reflective light guide 220. Since the arrangement accuracy of the LED element 14 of the light source and the LED collimator lens 18 greatly affects the efficiency of the light source, the optical axis accuracy of about 50 µm is usually required. Therefore, as a countermeasure against the decrease in mounting accuracy due to expansion of the LED collimator lens 18 caused by the heat generated by the LED, the inventors have proposed a structure of a light source unit 223 in which several LED elements 14 and the LED collimator lens 18 are integrated, and the decrease in mounting accuracy is reduced by using a plurality of units or a single unit for the light source apparatus.

Figure 18:
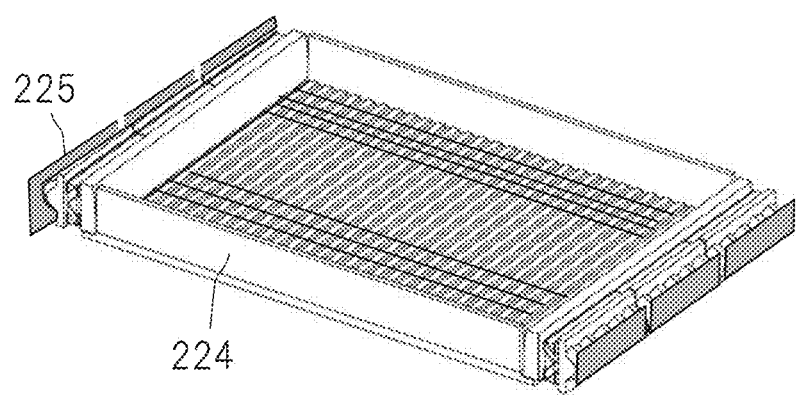
FIG. 18 is a diagram showing an example of a specific configuration of the light source apparatus according to one embodiment of the present invention.
Figure 18:
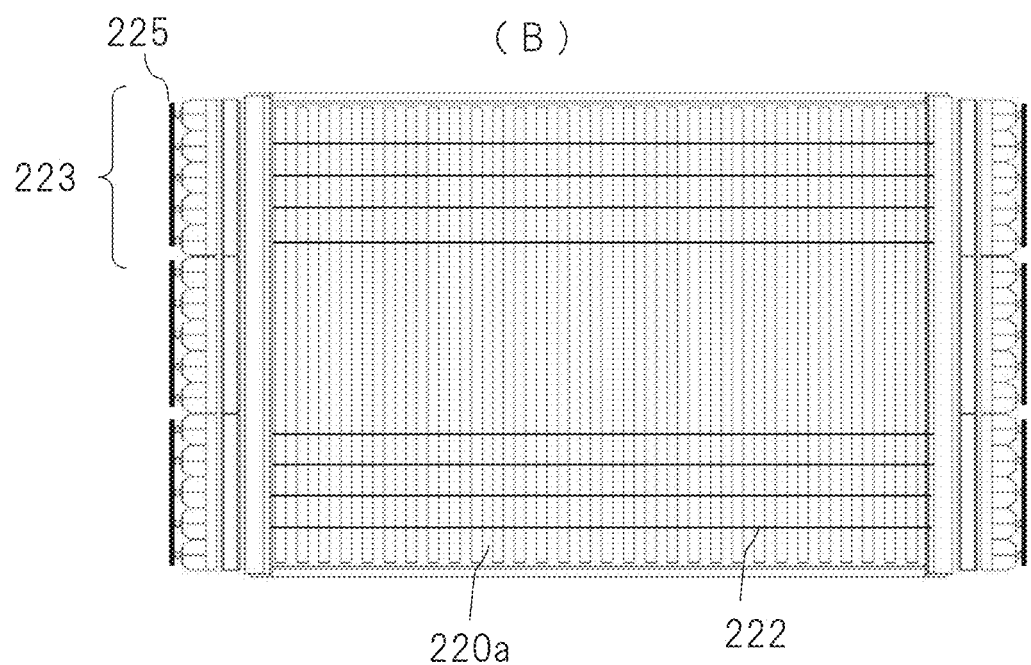
Figure 18:
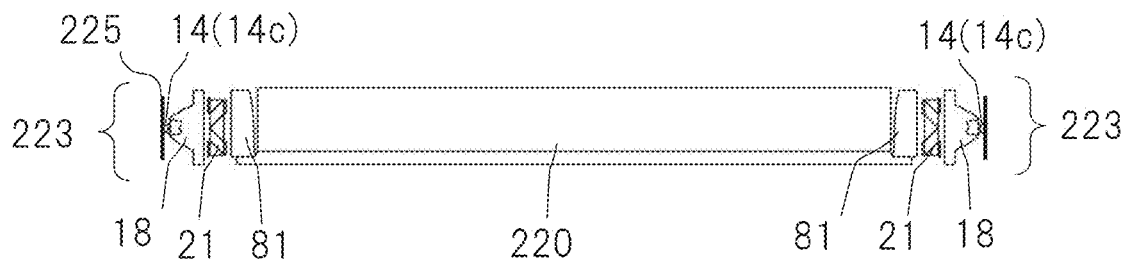

In the embodiment shown in FIG. 18(A), FIG. 18(B), and FIG. 18(C), a plurality of the light source units 223 in which the LED element 14 and the LED collimator lens 18 are integrated are mounted at both ends of the reflective light guide 220 in the longitudinal direction (three units on each side in the embodiment of FIG. 18), thereby achieving the uniform luminance of the light source apparatus. On a reflection surface 220a of the light guide 220, a plurality of concave-convex patterns 222 substantially parallel to the light source unit are formed, and the amount of light entering the video display apparatus can be controlled highly accurately because the surface of even the single concave-convex pattern 222 forms a polyhedron. In the present embodiment, the shape of the reflection surface is described as the concave-convex pattern 222, but it may be a pattern in which triangular surfaces or corrugated surfaces are regularly or irregularly arranged, and any shape can be adopted as long as the light distribution pattern directed from the light guide 220 to the video display apparatus can be controlled by the surface shape. In addition, it is preferable that a light blocking wall 224 is provided on the side surface of the light guide 220 so as to prevent the light controlled by the LED collimator lens 18 from leaking from the light source apparatus 13 to the outside, and the LED element 14 is designed so as to improve heat dissipation by providing a metal base 225.

<Lenticular Sheet>

The function of the lenticular lens that controls the diffusion characteristics of the light emitted from the video display apparatus 1 described above will be described below. By optimizing the lens shape of the lenticular lens, it is possible to efficiently obtain the air floating video 3 by the transmission or reflection of the light emitted from the video display apparatus 1 at the window glass 105. Namely, by providing a sheet for controlling the diffusion characteristics of the video light from the video display apparatus 1 by combining two lenticular lenses or arranging a microlens array in a matrix, the luminance (relative luminance) of the video light in the X-axis and Y-axis directions can be controlled in accordance with the reflection angle (the vertical direction is 0 degrees) thereof. In the present embodiment, by such a lenticular lens, the luminance characteristics in the vertical direction can be made steep as shown in FIG. 16(B), as compared with the conventional case. Further, the luminance (relative luminance) of light by the reflection and diffusion can be enhanced by changing the balance of the directional characteristics in the vertical direction (positive and negative directions on the Y axis). By these effects, the video light having a narrow diffusion angle (in other words, high straightness) and only a specific polarized component like the video light from the surface-emitting laser video source is obtained, and the air floating video by the retroreflection efficiently reaches the eyes of the observer while suppressing the ghost image that has been generated in the retroreflector in the case of using the video display apparatus in the conventional technique.

Further, with the above-described light source apparatus, directional characteristics with significantly narrower angle in both the X-axis direction and the Y-axis direction with respect to the diffusion characteristics of the light emitted from the general liquid crystal display panel (denoted as conventional in the drawings) shown in FIG. 16(A) and FIG. 16(B) can be realized. As a result, it is possible to realize a video display apparatus that emits light of a specific polarized wave that emits a video light flux that is nearly parallel to a specific direction.

Figure 15:
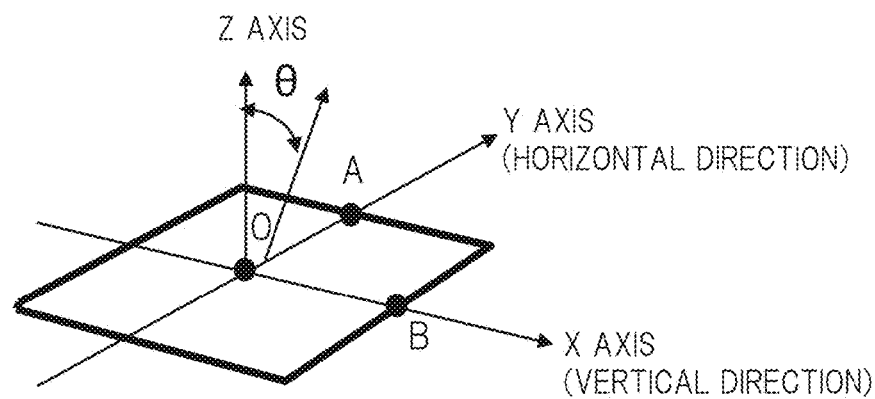
FIG. 15 is an explanatory diagram for describing diffusion characteristics of the video display apparatus.
Figure 15:
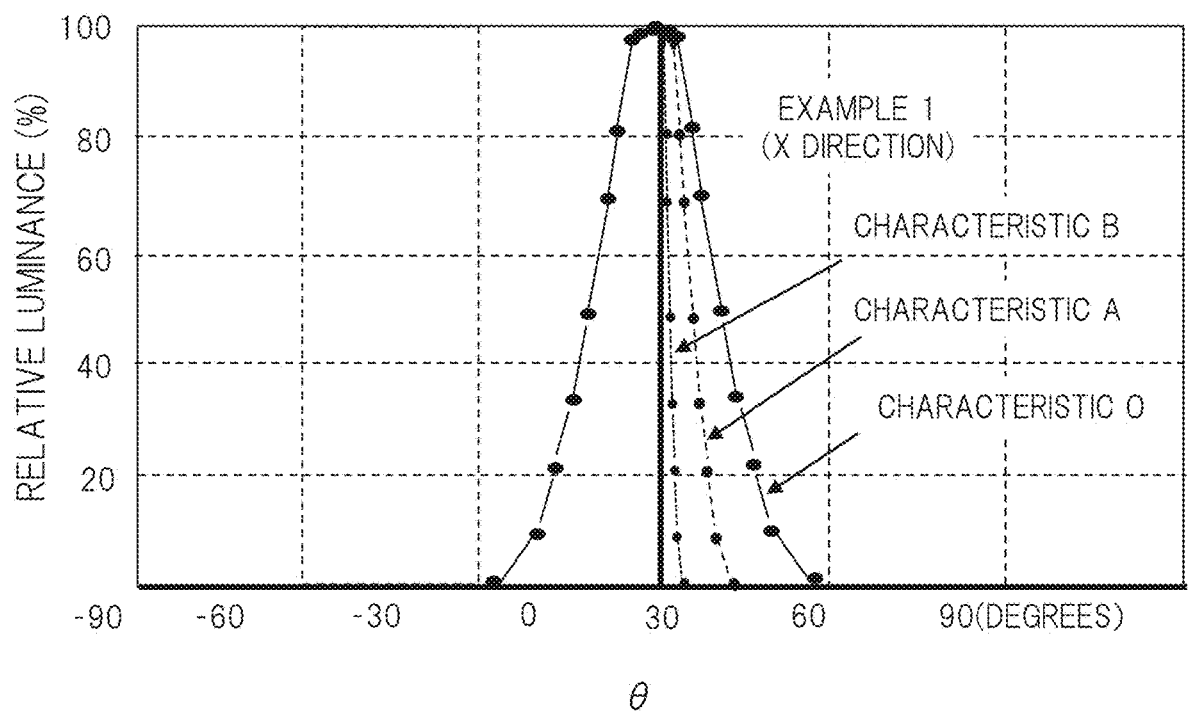

FIG. 15 shows an example of the characteristics of the lenticular lens adopted in the present embodiment. In this case, in particular, the characteristics in the X axis (vertical direction) are shown, and the characteristic O indicates a vertically symmetrical luminance characteristic in which the peak in the light emission direction is at an angle of around 30 degrees upward from the vertical direction (0 degrees). Further, the characteristics A and B each indicate an example of a characteristic in which video light above the peak luminance is condensed at around 30 degrees to increase the luminance (relative luminance). Therefore, in the characteristics A and B, the luminance (relative luminance) of light is sharply reduced at an angle exceeding 30 degrees as compared with the characteristic O.

Namely, in the optical system including the above-described lenticular lens, when the video light flux from the video display apparatus 1 enters the retroreflector 2, the emission angle and the viewing angle of the video light aligned at a narrow angle can be controlled by the light source apparatus 13 or 230, and the degree of freedom of installation of the retroreflector 2 can be significantly improved. As a result, it is possible to significantly improve the degree of freedom of the relationship of the imaging position of the air floating video 3 which is imaged at a desired position by the reflection or the transmission at the window glass 105 in FIG. 1. Consequently, the light having a narrow diffusion angle (high straightness) and only a specific polarized component is obtained, and can efficiently reach the eyes of an observer outdoors or indoors. According to this, even if the intensity (luminance) of the video light from the video display apparatus 1 is reduced, the observer can accurately recognize the video light and obtain information. In other words, by reducing the output of the video display apparatus 1, it is possible to realize the air floating video display apparatus with lower power consumption.

In the foregoing, various embodiments have been described in detail, but the present invention is not limited to the above-described embodiments, and includes various modifications. For example, in the above-described embodiments, the entire system has been described in detail so as to make the present invention easily understood, and the present invention is not necessarily limited to that including all the configurations described above. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

In the technique according to the present embodiment, by displaying video information as a high-resolution and high-brightness air floating video in the air floating state, for example, the user can operate without feeling anxious about contact infection of infectious diseases. If the technique according to the present embodiment is applied to a system used by an unspecified number of users, it will be possible to provide a non-contact user interface that can reduce the risk of contact infection of infectious diseases and can eliminate the feeling of anxiety. In this way, it is possible to contribute to "Goal 3: Ensure healthy lives and promote well-being for all at all ages" in the Sustainable Development Goals (SDGs) advocated by the United Nations. In addition, in the technique according to the present embodiment, only normal reflected light is efficiently reflected with respect to the retroreflector by making the divergence angle of the emitted video light small and aligning the light with a specific polarized wave, and thus a bright and clear air floating video can be obtained with high light utilization efficiency. With the technique according to the present embodiment, it is possible to provide a highly usable non-contact user interface capable of significantly reducing power consumption. In this way, it is possible to contribute to "Goal 9: Build resilient infrastructure, promote inclusive and sustainable industrialization and foster innovation" in the Sustainable Development Goals (SDGs) advocated by the United Nations.

REFERENCE SIGNS LIST

1: video display apparatus, 2: retroreflector, 3: air floating video, 4: plane mirror, 5: input/output terminal, 11: liquid crystal display panel, 12: absorptive polarizing plate, 13: light source apparatus, 21: λ/4 plate, 100: transparent member, 101: beam splitter (polarization separator), 106: housing, 112: absorptive polarizing plate, 601: housing upper portion, 602: housing lower portion, 603: upper surface, 604: slope, 605: window portion, 606: side surface, 607: side surface, 608: lower surface, 610: control board, 611: rechargeable battery

The invention claimed is:

1. An air floating video display apparatus configured to form an air floating video, the air floating video display apparatus comprising:
   a housing having a shape that is longer in a height direction than in a direction orthogonal to the height direction;
   a window portion which is provided in a part of the housing and through which a video light for forming the air floating video passes;
   a video display apparatus which is provided inside the housing and includes a light source apparatus and a liquid crystal display panel configured to generate the video light of a specific polarized wave for forming the air floating video based on a light from the light source apparatus and emit the generated light;
   a polarization separator which is provided inside the housing and is configured to transmit the video light of the specific polarized wave from the video display apparatus and reflect the video light from a retroreflector;
   the retroreflector which is provided inside the housing and is configured to retroreflect the video light from the polarization separator;
   a retardation plate provided on a retroreflection surface of the retroreflector; and
   a plane mirror which is arranged in a space connecting the video display apparatus and the polarization separator inside the housing and is configured to reflect the video light of the specific polarized wave from the video display apparatus toward the polarization separator, wherein
   in an up-down direction of the housing, the retroreflector is arranged above an arrangement position of the polarization separator, the plane mirror and the video display apparatus are arranged below the arrangement position of the polarization separator, and an arrangement position of the plane mirror is above an arrangement position of the video display apparatus.

2. The air floating video display apparatus according to claim 1,
   wherein at least a part of the housing can be stored in a bottle holder in a vehicle.

3. The air floating video display apparatus according to claim 1,
   wherein the housing has a cylindrical shape.

4. The air floating video display apparatus according to claim 1,
   wherein the housing has a slope obtained by obliquely cutting out a part of the housing including an upper surface and a side surface,
   wherein the window portion is provided in the slope, and
   wherein the video light for forming the air floating video is emitted obliquely upward through the window portion in the slope.

5. The air floating video display apparatus according to claim 1,
   wherein the polarization separator, the retroreflector, and the window portion are arranged such that each one side thereof is adjacent to each other.

6. The air floating video display apparatus according to claim 1,
   wherein the housing includes a housing upper portion and a housing lower portion,
   wherein the video display apparatus, the plane mirror, the polarization separator, the retroreflector, and the retardation plate are accommodated in the housing upper portion, and
   wherein a control board and a rechargeable battery are accommodated in the housing lower portion.

7. The air floating video display apparatus according to claim 1,
   wherein a lid is provided outside the window portion.

8. The air floating video display apparatus according to claim 1,
   wherein the light source apparatus has narrow-angle diffusion characteristics.

9. The air floating video display apparatus according to claim 1,
   wherein the light source apparatus supplies a light having narrow-angle diffusion characteristics and a specific polarized wave.

10. The air floating video display apparatus according to claim 1, comprising:
    an input/output terminal provided in the housing; and
    a rechargeable battery provided in a lower portion of the housing,
    wherein power is supplied from outside to the rechargeable battery through the input/output terminal.

11. The air floating video display apparatus according to claim 1, comprising:
    an input/output terminal provided in the housing,
    wherein a signal is supplied from outside to the video display apparatus through the input/output terminal.

12. The air floating video display apparatus according to claim 1,
    wherein the polarization separator is composed of a reflective polarizing plate or a metal multilayer film configured to reflect a specific polarized wave.

13. The air floating video display apparatus according to claim 1,
wherein a transparent member is provided in the window portion, and
wherein an absorptive polarizing plate is provided on at least one surface of the transparent member.

14. The air floating video display apparatus according to claim 1, comprising:
an absorptive polarizing plate provided on a video display surface of the liquid crystal display panel.

15. The air floating video display apparatus according to claim 1, comprising:
a light blocking member for preventing the video light having a divergence angle exceeding a specific angle from the liquid crystal display panel from entering the retroreflector, the light blocking member being provided in a space connecting the video display apparatus and the retroreflector via the polarization separator inside the housing.

16. The air floating video display apparatus according to claim 1,
wherein a surface roughness of the retroreflection surface of the retroreflector is set such that a ratio between an amount of blur of the air floating video and a pixel size of the video display apparatus becomes 40% or less.

17. The air floating video display apparatus according to claim 1,
wherein the light source apparatus includes:
a point or plane shaped light source;
an optical element configured to reduce a divergence angle of a light from the light source;
a polarization converter configured to align the light from the light source into a polarized light in a specific direction; and
a light guide having a reflection surface configured to propagate the light from the light source to the liquid crystal display panel, and
wherein a light flux is controlled by a shape and surface roughness of a reflection surface of the light source apparatus, whereby a video light flux having a narrow divergence angle is emitted as the video light from the liquid crystal display panel.

18. The air floating video display apparatus according to claim 17,
wherein a surface roughness of the retroreflection surface of the retroreflector is set to 160 nm or less,
wherein the light guide is arranged to face the liquid crystal display panel,
wherein the reflection surface configured to reflect the light from the light source toward the liquid crystal display panel is provided inside the light guide or on a surface of the light guide, and
wherein the liquid crystal display panel emits the video light flux having the narrow divergence angle by modulating a light intensity in accordance with an input video signal based on the light from the light guide.

19. The air floating video display apparatus according to claim 17,
wherein the light source apparatus controls a part or all of the divergence angle of the light flux by the shape and surface roughness of the reflection surface such that the light divergence angle of the liquid crystal display panel is within ±30 degrees.

20. The air floating video display apparatus according to claim 17,
wherein the light source apparatus controls a part or all of the divergence angle of the light flux by the shape and surface roughness of the reflection surface such that the light divergence angle of the liquid crystal display panel is within ±15 degrees.

21. The air floating video display apparatus according to claim 17,
wherein the light source apparatus controls a part or all of the divergence angle of the light flux by the shape and surface roughness of the reflection surface such that the light divergence angle of the liquid crystal display panel is different from a horizontal divergence angle and a vertical divergence angle.

22. The air floating video display apparatus according to claim 17,
wherein the light source apparatus has a contrast performance obtained by multiplying a contrast obtained by characteristics of a polarizing plate provided on each of a light incident surface and a light emission surface of the liquid crystal display panel by a reciprocal of a polarization conversion efficiency of the polarization converter.

23. The air floating video display apparatus according to claim 17,
wherein the light source apparatus has a contrast performance obtained by multiplying a contrast obtained by characteristics of a polarizing plate provided on each of a light incident surface and a light emission surface of the liquid crystal display panel by a reciprocal of a polarization conversion efficiency of the polarization converter and a reciprocal of a cross transmittance of the polarization separator, respectively.

* * * * *